(12) United States Patent
He et al.

(10) Patent No.: US 10,841,615 B2
(45) Date of Patent: Nov. 17, 2020

(54) SYSTEMS AND METHODS FOR MODEL PARAMETER OPTIMIZATION IN THREE DIMENSIONAL BASED COLOR MAPPING

(71) Applicant: VID SCALE, INC., Wilmington, DE (US)

(72) Inventors: Yuwen He, San Diego, CA (US); Yan Ye, San Diego, CA (US)

(73) Assignee: VID SCALE, Inc., Wilmington, DE (US)

( * ) Notice: Subject to any disclaimer, the term of this patent is extended or adjusted under 35 U.S.C. 154(b) by 0 days.

(21) Appl. No.: 16/163,075

(22) Filed: Oct. 17, 2018

(65) Prior Publication Data

US 2019/0052904 A1 Feb. 14, 2019

Related U.S. Application Data

(63) Continuation of application No. 14/742,013, filed on Jun. 17, 2015, now Pat. No. 10,154,286.
(Continued)

(51) Int. Cl.
*H04N 19/597* (2014.01)
*H04N 19/147* (2014.01)
(Continued)

(52) U.S. Cl.
CPC ......... *H04N 19/597* (2014.11); *H04N 19/124* (2014.11); *H04N 19/13* (2014.11);
(Continued)

(58) Field of Classification Search
CPC .... H04N 19/124; H04N 19/13; H04N 19/147; H04N 19/176; H04N 19/184;
(Continued)

(56) References Cited

U.S. PATENT DOCUMENTS

| 7,259,798 B2 | 8/2007 | Lee et al. |
| 2005/0024662 A1 | 2/2005 | Yamada |

(Continued)

FOREIGN PATENT DOCUMENTS

| CN | 103096066 A | 5/2013 |
| EP | 1331824 A2 | 7/2003 |

(Continued)

OTHER PUBLICATIONS

Bordes et al. "Color Gamut Scalable Video Coding for SHVC", IEEE, Feb. 13, 2014, pp. 301-304. (Year: 2014).*
(Continued)

*Primary Examiner* — William C Vaughn, Jr.
*Assistant Examiner* — Naod W Belai
(74) *Attorney, Agent, or Firm* — Condo Roccia Koptiw LLP

(57) ABSTRACT

Systems, methods, and devices are disclosed for performing adaptive color space conversion and adaptive entropy encoding of LUT parameters. A video bitstream may be received and a first flag may be determined based on the video bitstream. The residual may be converted from a first color space to a second color space in response to the first flag. The residual may be coded in two parts separated by the most significant bits and least significant bits of the residual. The residual may be further coded based on its absolute value.

14 Claims, 15 Drawing Sheets

Related U.S. Application Data

(60) Provisional application No. 62/014,610, filed on Jun. 19, 2014, provisional application No. 62/017,743, filed on Jun. 26, 2014.

(51) Int. Cl.
   | | |
   |---|---|
   | *H04N 19/124* | (2014.01) |
   | *H04N 19/30* | (2014.01) |
   | *H04N 19/176* | (2014.01) |
   | *H04N 19/13* | (2014.01) |
   | *H04N 19/463* | (2014.01) |
   | *H04N 19/91* | (2014.01) |
   | *H04N 19/186* | (2014.01) |
   | *H04N 19/184* | (2014.01) |

(52) U.S. Cl.
   CPC ......... *H04N 19/147* (2014.11); *H04N 19/176* (2014.11); *H04N 19/184* (2014.11); *H04N 19/186* (2014.11); *H04N 19/30* (2014.11); *H04N 19/463* (2014.11); *H04N 19/91* (2014.11)

(58) Field of Classification Search
   CPC .... H04N 19/186; H04N 19/30; H04N 19/463; H04N 19/597; H04N 19/91
   USPC .................................................. 375/240.12
   See application file for complete search history.

(56) References Cited

U.S. PATENT DOCUMENTS

| | | | |
|---|---|---|---|
| 2005/0264836 A1 | 12/2005 | Gotoh et al. | |
| 2007/0216971 A1 | 9/2007 | Koyama | |
| 2007/0223823 A1* | 9/2007 | Islam .................. | H04N 19/132 |
| | | | 382/232 |
| 2010/0002943 A1 | 1/2010 | Moon et al. | |
| 2012/0256904 A1 | 10/2012 | Jung et al. | |
| 2012/0328206 A1* | 12/2012 | Asano .................. | H04N 19/13 |
| | | | 382/233 |
| 2013/0022120 A1 | 1/2013 | Gupte et al. | |
| 2014/0247869 A1 | 9/2014 | Su et al. | |
| 2014/0314142 A1 | 10/2014 | Oh et al. | |
| 2015/0010068 A1* | 1/2015 | Francois ............... | H04N 19/88 |
| | | | 375/240.08 |
| 2015/0117519 A1 | 4/2015 | Kim et al. | |
| 2016/0050426 A1 | 2/2016 | Piao et al. | |
| 2016/0057454 A1* | 2/2016 | Bordes .................. | H04N 19/50 |
| | | | 375/240.12 |

FOREIGN PATENT DOCUMENTS

| | | |
|---|---|---|
| JP | 2003-248838 A | 9/2003 |
| RU | 2291585 C2 | 1/2007 |
| TW | 201332363 A | 8/2013 |
| WO | WO 2013/116415 A1 | 8/2013 |

OTHER PUBLICATIONS

Wikipedia, "Golomb Coding", Available at https://en.wikipedia.org/w/index.php?title=Golomb_coding&oldid=610111695, Retrieved on Jun. 21, 2019, pp. 1-6.

Aminlou et al., "SCE1: Color Gamut Scalability Using Gain-Offset Models", Nokia, JCTVC-Q0072, 17th Meeting: Valencia, ES, Mar. 27-Apr. 4, 2014,10 pages.

Auyeung et al., "Color Gamut Scalable Video Coding with Piecewise Linear Predictions", Document: JCTVC-N0271, Sony Electronics Inc.,Joint Collaborative Team on Video Coding (JCT-VC) of ITU-T SG 16 WP 3 and ISO/IEC JTC 1/SC 29/WG 11,14th Meeting: Vienna, Austria, AT, Jul. 29-Aug. 2, 2013, 3 pages.

Auyeung, Jun Xu Cheung, "AhG 5 and 18: Coding of High Bit-Depth Source with Lower Bit-Depth Encoders and a Continuity Mapping", Sony Electronics, Inc., JCTVC-P0173, 16th Meeting: San Jose, US, Jan. 9-17, 2014, 8 pages.

Balaji et al., "Preprocessing Methods for Improved Lossless Compression of Color Lookup Tables", Journal of Imaging Science and Technology, Jul. 22, 2008, 9 pages.

Bordes et al., "Color Gamut Scalable Video Coding for SHVC", IEEE, Picture Coding Symposium, Dec. 8, 2013, pp. 301-304.

Bordes et al., "Color Mapping SEI Message", JCTVC-N0180, Jul. 25-Aug. 2, 2013, pp. 1-10.

Bordes et al., "AHG14: Color Gamut Scalable Video Coding using 3D LUT: New Results", Document: JCTVC-N0168-r1, Technicolor, Joint Collaborative Team on Video Coding (JCT-VC) of ITU-T SG 16 WP 3 and ISO/IEC JTC 1/SC 29/WG 11,14th Meeting: Vienna, AT, Jul. 25-Aug. 2, 2013, pp. 1-11.

Bross et al., "High Efficiency Video Coding (HEVC) Text Specification Draft 7", JCTVC-11003_d1, 9th Meeting: Geneva, CH, Apr. 27-May 7, 2012, 273 pages.

Chen et al., "Preliminary Version of High Efficiency Video Coding (HEVC) Scalable Extension Draft 6", JCTVC-Q1008, 17th Meeting: Valencia, ES, Mar. 27-Apr. 4, 2014, 135 pages.

Chen et al., "Scalable HEVC (SHVC) Test Model 6 (SHM 6)", JCTVC-Q1007, 17th Meeting: Valencia, ES, Mar. 27-Apr. 4, 2014, 11 pages.

He et al., "Non-SCE4/AHG14: Combined Bit-Depth and Color Gamut Conversion with 3D LUT for SHVC Color Gamut Scalability", JCTVC-O0161, Oct. 23-Nov. 1, 2013, pp. 1-7.

He et al., "SCE1: Combined Bit-Depth and Color Gamut Conversion with 3D LUT for SHVC Color Gamut Scalability", JCTVC-P0186, 16th Meeting: San Jose, USA, Jan. 9-17, 2014, 5 pages.

Isenburg et al., "Lossless Compression of Predicted Floating-Point Geometry", Computer-Aided Design, vol. 37, Elsevier Publishers, Sep. 20, 2004, pp. 869-877.

ISO/IEC, "Information Technology-Coding of Audio-Visual Objects", International Standard, Part2: Visual, ISO/IEC 14496-2, Dec. 2001, 536 pages.

ISO/IEC, "Information Technology-Coding of Moving Pictures and Associated Audio for Digital Storage Media at up to About 1,5 Mbit/s-Part 2: Video", ISO/IEC 11172-2:1993, Nov. 2003, 6 pages.

ISO/IEC, "Information Technology-Generic Coding of Moving Pictures and Associated Audio Information: Video", ISO/IEC 13818-2, Dec. 2000, 220 pages.

ISO/IEC, "Joint Call for Proposals on Scalable Video Coding Extensions of High Efficiency Video Coding (HEVC)", ISO/IEC JTC1/SC29/WG11 N12957, Stockholm, Sweden, Jul. 2012, 11 pages.

ITU, "Advanced Video Coding for Generic Audiovisual Services", ITU-T Recommendation H.264, Nov. 2007, 564 pages.

ITU, "Codec for Audiovisual Services AT n x 384 kbiUs", Reedition of CCITT Recommendation H.261 Published in the Blue Book, Fascicle 111.6, Nov. 1988, 14 pages.

ITU-R, "Parameter Values for the HDTV Standards for Production and International Programme Exchange", ITU-R Recommendation BT.709, Dec. 2010, 18 pages.

ITU-R, "Parameter Values for UHDTV Systems for Production and International Programme Exchange", ITU-R Recommendation BT.2020, Apr. 2012, 8 pages.

ITU-T, "Transmission of Non-Telephone Signals-Video Coding for Low Bit Rate Communication", ITU-T Recommendation H.263, Mar. 1996, 52 pages.

Kerofsky et al., "Color Gamut Scalable Video Coding: New Results", Sharp Labs of America, JCTVC-L0334, 12th Meeting: Geneva, CH, Jan. 14-23, 2013, 17 pages.

Li et al., "Non-SCE1: Asymmetric 3D LUT for Color Gamut Scalability", JCTVC-P0063_r1, Jan. 9-17, 2014, pp. 1-7.

Li et al., "Non-SCE1: Improved CGS partitioning on top of SHM-6", JCTVC-R0151, Jun. 2014, 4 pages.

Li et al., "SCE1.2: Color Gamut Scalability with Asymmetric 3D LUT", Qualcomm, Inc., InterDigital Communications, Inc., Technicolor, JCTVC-Q0048, 17th Meeting: Valencia, ES, Mar. 27-Apr. 4, 2014, 11 pages.

Luthra et al., "Requirements of the Scalable Enhancement of HEVC", WG11 Requirements and Video, ISO/IEC JTC1/SC29/WG11 N12956, Stockholm, Sweden, Jul. 2012, 12 pages.

(56) References Cited

OTHER PUBLICATIONS

Luthra et al., "Use Cases of the Scalable Enhancement of HEVC", N12955, WG11 Requirements and Video, Stockholm, Sweden, Jul. 2012, 8 pages.

Ohm, Jens-Rainer, "Advances in Scalable Video Coding", Proceedings of IEEE, vol. 93, No. 1, Jan. 2005, 15 pages.

Ortega et al., "Rate-Distortion Methods for Image and Video Compression", IEEE Signal Processing Magazine, IEEE Service Center, Piscataway, NJ, vol. 15, No. 6, Nov. 1998, pp. 23-50.

Schwarz et al., "Overview of the Scalable Video Coding Extension of the H.264/AVC Standard", IEEE Transactions on Circuits and Systems for Video Technology, vol. 17, No. 9, Sep. 2007, 18 pages.

Sullivan et al., "Rate-Distortion Optimization for Video Compression", Signal Processing Magazine, IEEE, vol. 15, No. 6, Nov. 1998, pp. 74-90.

Wikipedia, "3D Lookup Table", Available online at https://en.wikipedia.org/wiki/3D_lookup_table, retrieved on Jun. 23, 2017, 2 pages.

Zhan et al., "Test Data Compression Scheme Based on Variable-to-Fixed-Plus-Variable-Length Coding", Journal of Systems Architecture, Elsevier, vol. 53, No. 11, Aug. 14, 2007, pp. 877-887.

Bordes et al., "AHG14: Color Gamut Scalable Video Coding using 3D LUT", JCTVC-M0197, Joint Collaborative Team on Video Coding (JCT-VC) of ITU-T SG 16 WP 3 and ISO/IEC JTC 1/SC 29/WG 11, 13th Meeting: Incheon, KR, Apr. 18-26, 2013, pp. 1-10.

Bordes et al., "SCE4: Results on 5.3-Test1 and 5.3-Test2", JCTVC-O0159, Joint Collaborative Team on Video Coding (JCT-VC) of ITU-T SG 16 WP 3 and ISO/IEC JTC 1/SC 29/WG 11, 15th Meeting: Geneva, CH, Oct. 23-Nov. 1, 2013, pp. 1-12.

Bossen, Frank, "Studio Profile: Compressing the Uncompressed Mode", 54 MPEG Meeting, ISO/IEC JTC1/SC29/WG11, M6567, Oct. 24, 2000.

Nguyen, Tung, "Reduced-Complexity Entropy Coding of Transform Coefficient Levels using Truncated Golomb-Rice Codes in Video Compression", Image processing (ICIP), 18th IEEE International Conference, Sep. 11, 2011.

Ye et al., "Non-SCE1: 3D LUT with Larger Sizes", JCTVC-R0179, Joint Collaborative Team on Video Coding (JCT-VC) of ITU-T SG 16 WP 3 and ISO/IEC JTC 1/SC 29/WG 11, 18th Meeting: Sapporo, JP, Jun. 30-Jul. 9, 2014, pp. 1-6.

Roodaki et al., "Rate-Distortion Optimization of Scalable Video Codecs", Signal Processing: Image Communication, vol. 25, 2010, pp. 276-286.

* cited by examiner

SYSTEMS AND METHODS FOR MODEL PARAMETER OPTIMIZATION IN THREE DIMENSIONAL BASED COLOR MAPPING

CROSS-REFERENCE TO RELATED APPLICATIONS

This application is a continuation application of U.S. Non-Provisional application Ser. No. 14/742,013, filed Jun. 17, 2015, which claims priority to U.S. Provisional Patent Application Ser. No. 62/014,610, filed Jun. 19, 2014, and U.S. Provisional Patent Application Ser. No. 62/017,743, filed Jun. 26, 2014, each of which is entitled "SYSTEMS AND METHODS FOR MODEL PARAMETER OPTIMIZATION IN THREE DIMENSIONAL BASED COLOR MAPPING" and each of which is incorporated herein by reference in its entirety.

BACKGROUND

In recent years, wireless technologies have been demanding higher data throughput rates and lower latencies. One common application that drives this demand is video rendering on mobile devices (also referred to as "User Equipment" or simply "UE"). Carrier aggregation and multi-RAT (Radio Access Technology) capabilities have been introduced to help address the need for higher data rates demanded by such applications and other services that use large amounts of data. Carrier aggregation may allow operators to offload some of their data traffic to secondary cells (e.g., transmitted on secondary component carriers). The use of multi-RAT technologies, such as RAT aggregation, may allow reception and/or transmission over multiple RATs, e.g., simultaneously. Such RATs that may be used together may include Long Term Evolution (LTE) used with Wideband Code Division Multiple Access (WCDMA), LTE used with WiFi, etc. In such aggregation approaches an evolved Node B (eNB) and a UE may communicate over multiple parallel paths.

Various digital video compression technologies have been developed to assist with efficient digital video communication, distribution, and consumption. Widely deployed standards include International Telecommunication Union (ITU) coding standards such as H.261, H.263, and H.264, as well as other standards such as MPEG-1, MPEG-2, MPEG-4 part2, and MPEG-4 part 10 Advanced Video Coding (AVC). Another video coding standard, High Efficiency Video Coding (HEVC), has been developed by the ITU-T Video Coding Experts Group (VCEG) and the International Organization for Standardization/International Electrotechnical Commission (ISO/IEC) Moving Picture Experts Group (MPEG). The HEVC standard may achieve twice the compression efficiency as that possible using H.264 and MPEG-4 part 10 AVC. Thus, in terms of bandwidth utilization, HEVC requires half the bit rate of H.264 or MPEG-4 part 10 AVC, while providing the same or similar video quality.

As the use of mobile devices, such as smartphones, tablets, etc., increases, there is a corresponding increased demand for video content and services over wireless networks. Thus, mobile devices of widely varying capabilities in terms of computing power, memory, storage size, display resolution, display frame rate, display color gamut, etc. will be expected to accommodate video consumption to be successful in today's mobile device market. Likewise, the wireless network with which such devices communicate will also be expected to accommodate video services and other bandwidth intensive services and applications.

SUMMARY

Systems, methods, and devices are disclosed for decoding 3-dimensional look-up table parameters for use in video decoding. In an embodiment, methods, systems, and devices may be implemented for decoding 3-dimensional look-up table parameters for use in video decoding by receiving a delta value, most significant bits of a prediction residual value, and least significant bits of the prediction residual value. A prediction residual value may be generated by determining a first value representing a quantity of fixed-length coded least significant bits based on the delta value, determining the least significant bits of the prediction residual value based on the first value, and assembling the prediction residual value using the most significant bits of the prediction residual value and the least significant bits of the prediction residual value. A prediction residual value may be associated with one of a Y color component, a U color component, or a V color component. A sign of a prediction residual value may be received and used to assemble the prediction residual value. Assembling a prediction residual value may include left bit shifting most significant bits of the prediction residual value by a first value, adding least significant bits of the prediction residual value to the prediction residual value, and/or applying a sign of the prediction residual value to the prediction residual value. A prediction residual value may be associated with at least one of a color component, a 3-dimensional look-up table parameter, and a 3-dimensional look-up table octant.

Systems, methods, and devices are also disclosed for encoding 3-dimensional look-up table parameters for use in video encoding. In an embodiment, methods, systems, and devices may be implemented for coding 3-dimensional look-up table parameters for use in video encoding by determining a prediction residual value, determining a delta value based on a quantity of least significant bits of the prediction residual value, and encoding the delta value. The most significant bits and/or the least significant bits of the prediction residual value may be encoded based on the delta value. Determining a delta value may include determining 3-dimensional look-up table data and/or determining a delta value based on 3-dimensional look-up table data. Determining a delta value may also include determining a first quantity of bits required to code 3-dimensional look-up table data based on a first delta value, determining a second quantity of bits required to code the 3-dimensional look-up table data based on a second delta value, and selecting one of the first delta value and the second delta value as the delta value based on the first quantity of bits and the second quantity of bits. Selecting one of the first delta value and the second delta value may be based on whether the first quantity of bits is smaller than the second quantity of bits or the second quantity of bits is smaller than the first quantity of bits. Determining a quantity of bits required to code 3-dimensional look-up table data based on a delta value may include summing a quantity of bits required to code model parameters for one octant of a 3-dimensional look-up table. A sign of a prediction residual value may also be encoded. These and other aspects of the subject matter disclosed are set forth below.

DETAILED DESCRIPTION

Figure 1:
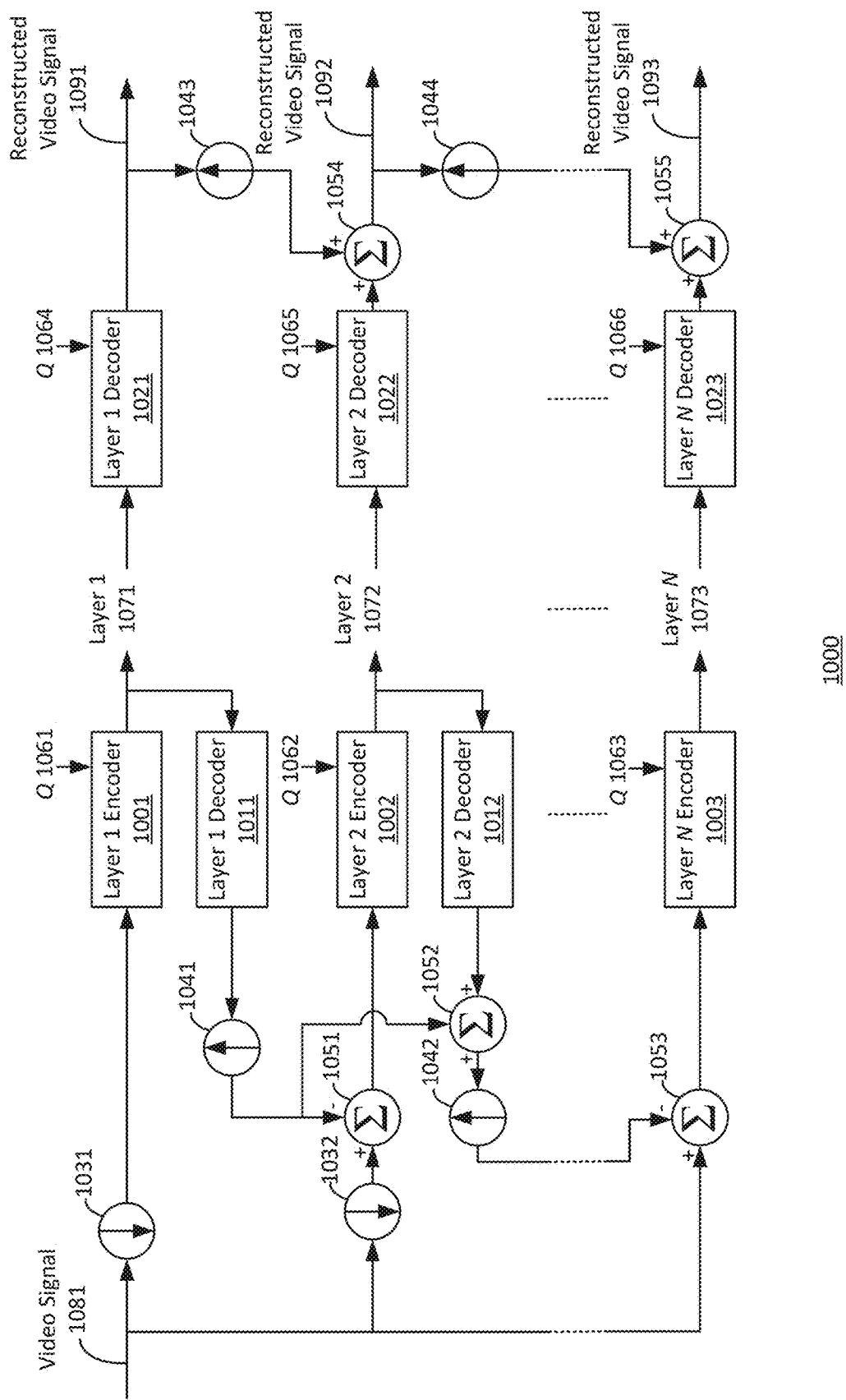
FIG. 1 illustrates an example system for implementing the disclosed embodiments.

A detailed description of illustrative examples will now be described with reference to the various figures. Although this description provides a detailed example of possible implementations, it should be noted that the details are intended to be exemplary only and in no way limit the scope of the application.

Various digital video compression technologies may be used to enable efficient digital video communication, distribution, and consumption. Examples of standards that may be used to enable such efficient digital video communication, distribution, and consumption may include those developed by ISO/IEC and/or ITU-T, such as H.261, MPEG-1, MPEG-2, H.263, MPEG-4 part2, and H.264/MPEG-4 part 10 AVC. HEVC is another example of such a standard. Versions of HEVC have been standardized jointly by ITU-T VCEG and the ISO/IEC MPEG. As noted herein, HEVC standards may achieve twice the compression efficiency as the compression efficiency that may be achievable with H.264/AVC.

Digital video services may be provided using TV services over satellite, cable, and/or terrestrial broadcasting channels. As the Internet on mobile devices becomes more common with the recent growth of smartphones and tablets with increased capabilities in resolution, memory, storage, and computation capability, a greater number of video applications (e.g., video chat, mobile video recording and sharing, and video streaming) may become more common and may require video transmission in heterogeneous environments (i.e., environments that may include devices of varying capabilities). Devices in such scenarios may be referred to as 3-screen or N-screen devices and may have various types and capabilities in terms of computing power, memory/storage size, display resolution, display frame rate, display color gamut, etc. Examples of such devices may include PCs, smart phones, tablets, TVs, etc. Such devices may accommodate video consumption via the Internet to satisfy users.

Network and transmission channels that may facilitate video consumption may have widely varying characteristics in terms of, for example, packet loss rate, available channel bandwidth, burst error rate, etc. Because video content traffic may be transmitted over a combination of wired networks and wireless networks, the underlying transmission channel characteristics may become complicated. In such scenarios, scalable video coding technologies may provide an attractive solution that may improve the quality of experience for video applications running on devices with different capabilities over heterogeneous networks. Scalable video coding may encode the signal once at its highest representation (temporal resolution, spatial resolution, quality, etc.) and/or may enable decoding from subsets of one or more video stream(s), in some embodiments depending on a specific rate and/or representation requested by a given application and/or by a given client device. Scalable video coding may save bandwidth and/or storage compared to non-scalable solutions. The international video standards MPEG-2 Video, H.263, MPEG4 Visual, and H.264 may each have tools and/or profiles that support at least some modes of scalability.

FIG. 1 is a block diagram illustrating exemplary system 1000 that may represent a block-based hybrid scalable video encoding system. The spatial/temporal signal resolution to be represented by layer 1 1071 (e.g., a base layer) may first be generated by downsampling 1031 input video signal 1081 and providing it to layer 1 encoder 1001. Quantizer setting Q 1061 may be provided to encoder 1001 to configure encoder 1001 to provide a certain quality level of the base layer signal. The layer 1 1071 encoded signal may be provided to layer 1 decoder 1021 that may generate reconstructed video signal 1091. Layer 1 decoder 1021 may be configured with quantizer setting 1064 specifying a quality level for decoding an encoded layer 1 signal.

Base layer reconstructed video signal 1091 may be an approximation of some or all of the higher layer resolution levels. Reconstructed video signal 1091 may be utilized in the encoding and/or decoding of subsequent layers to, for example, more efficiently encode the subsequent higher layers. Upsampling unit 1043 may perform upsampling of base layer reconstructed signal 1091 to layer 2 1072's resolution and provide such an upsampled signal for adding 1054 to a layer 2 1072 decoded signal decoded by layer 2 decoder 1022. Layer 2 decoder 1022 may be configured with quantizer setting 1065 specifying a quality level for decoding an encoded layer 2 signal. Similar upsampling and signal addition may be performed throughout some or all layers (e.g., layers 1, 2, . . . N) using, for example, signal addition 1055, upsampling 1044, and layer N decoder 1023 to generate reconstructed video signal 1093 from layer N 1073 encoded signal generated by layer N encoder 1003. Layer N decoder 1023 may be configured with quantizer setting Q 1066 specifying a quality level for decoding a layer N 1073 signal. Note that downsampling and upsampling ratios may vary and may be related to a dimension of the scalability between two given layers.

In system 1000 of FIG. 1, for any given higher layer n (e.g., layer 2≤n≤N), a differential signal may be generated by subtracting an upsampled lower layer signal (e.g., a layer n−1 signal) from a current layer n signal and the difference signal may be encoded. If the video signals represented by two layers, e.g., n1 and n2, have the same spatial resolution, the corresponding downsampling and upsampling operations may be bypassed. Any given layer n (e.g., where $1 \leq n \leq N$) or a plurality of layers may be decoded without using any decoded information from higher layers. For example, layer 1 encoder 1001 output may be decoded by layer 1 decoder 1011, upsampled 1041, and subtracted 1051 from video signal 1081 that may be downsampled 1032 prior to such subtraction. Similarly, layer 2 encoder 1002 output may be decoded by layer 2 decoder 1012, added 1052 to the signal generated by upsampling 1041, upsampled 1042 and subtracted 1053 from video signal at a higher layer N before encoding at layer N encoder 1003 to generated layer N 1073 encoded signal. Note that encoders 1002 and 1003 may use quantizer settings Q 1062 and 1063, respectively, to determine a quality level for encoding a signal. Any other encoders and decoders contemplated herein may also use any input, setting, or signal to determine a quality level for encoding and/or decoding a signal, and all such embodiments are contemplated as within the scope of the instant disclosure.

Relying on coding of a residual signal (e.g., a difference signal between two layers) for all layers except a base layer, for example as shown in system 1000 of FIG. 1, may result in visual artifacts due to quantization and normalization of such a residual signal to restrict its dynamic range and additional quantization that may be performed during coding of the residual signal. One or more of the higher layer encoders may adopt motion estimation and/or motion compensated prediction as an encoding mode. Motion estimation and motion compensation in a residual signal may differ from conventional motion estimation and may be prone to visual artifacts. To minimize such visual artifacts, more sophisticated residual quantization, as well as joint quantization between quantizing and normalizing the residual signal to restrict its dynamic range and additional quantization performed during coding of the residual may be used.

Scalable Video Coding (SVC) may be considered an extension of ITU-T standard H.264 and ISO/IEC/MPEG 4 part 10 that may enable the transmission and decoding of partial bit streams to provide video services with lower temporal and/or spatial resolutions and/or reduced fidelity while retaining a relatively high reconstruction quality for the rate of the partial bit streams. A feature of SVC, referred to as Single Loop Decoding, may refer to an SVC decoder that may set up one motion compensation loop at the layer being decoded and may not set up one or more motion compensation loop at one or more other lower layers. For example, if a bitstream contains two layers, layer 1 (e.g., a base layer) and layer 2 (e.g., an enhancement layer), and if a decoder is configured to reconstruct layer 2 video, a decoded picture buffer and/or motion compensated prediction may be set up for layer 2, but not for layer 1 (e.g., the base layer upon which layer 2 may depend). With single loop decoding, deblocking filtering may also be limited to the layer being decoded. Thus, SVC may not require a reference picture from lower layers to be fully reconstructed, which may reduce computational complexity and memory usage at the decoder.

Single loop decoding may be achieved by constrained inter-layer texture prediction, where, for a current block in a given layer, spatial texture prediction from a lower layer may be permitted if the corresponding lower layer block is coded in intra-mode (which may also be referred to as restricted intra-prediction). In an embodiment, this may be due to a lower layer block being coded in intra-mode, where such a block may be reconstructed without the need for motion compensation operations and/or a decoded picture buffer.

To further improve rate-distortion efficiency of an enhancement layer, SVC may use additional inter-layer prediction techniques such as motion vector prediction, residual prediction, mode prediction, etc. from lower layers. Although a single loop decoding feature of SVC may reduce the computational complexity and/or memory usage at a decoder, single loop decoding may increase implementation complexity by using block-level inter-layer prediction methods. To compensate for the performance penalty that may be incurred by imposing the single loop decoding constraint, encoder design and computation complexity may be increased such that a desired level of performance may be achieved.

Scalable extensions of HEVC may be referred to as SHVC. Standards scalability for HEVC may refer to the type of scalability that may allow for the base layer to be encoded with an earlier standard, such as H.264/AVC or MPEG2, while one or more enhancement layers may be encoded using a more recent standard, such as the HEVC standard. Standards scalability may provide backward compatibility for legacy content that may have been encoded using previous standards. Standards scalability may enhance the quality of such legacy content with one or more enhancement layers that may be encoded with more current standards like HEVC that provide better coding efficiency.

Figure 2:
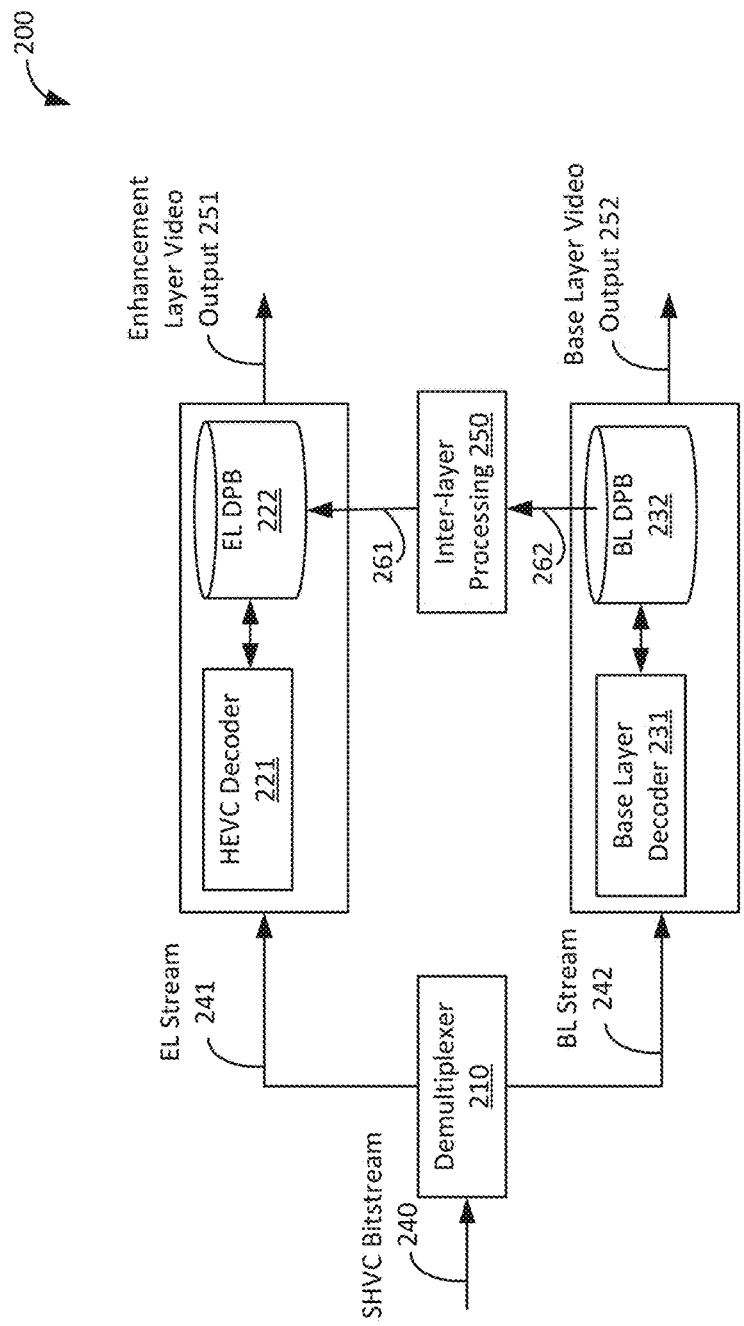
FIG. 2 illustrates an example system for implementing the disclosed embodiments.

FIG. 2 shows example block diagram 200 of an SHVC decoder for a 2-layer scalable system. SHVC may use a high level syntax-based scalable coding framework, where reconstructed pictures from a base layer may be processed into inter-layer reference (ILR) pictures. These ILR pictures may then be inserted into the enhancement layer decoded picture buffer (DPB) for prediction of the enhancement layer pictures. The inter-layer processing module in SHVC may include up-sampling for spatial scalability and bit depth scalability and color mapping for color gamut scalability.

As shown in FIG. 2, SHVC bitstream 240 may be demultiplexed into enhancement layer (EL) stream 241 and base layer (BL) stream 242 by demultiplexer 210. BL stream 242 may be decoded by base layer decoder 231 to generate reconstructed pictures that may be provided to base layer decoded picture buffer (BL DPB) 232 and that may be provided as base layer video output 252. BL DPB may provide 262 base layer reconstructed pictures to inter-layer processing 250 that may process such base layer reconstructed pictures to generate ILR pictures that may be provided 261 to enhanced layer decoded picture buffer (EL DPB) 222. HEVC decoder 221 may decode EL stream 241 and provide its reconstructed pictures to EL DPB 222, which may use such HEVC reconstructed pictures and ILR pictures received from inter-layer processing 250 to generate enhancement layer video output 251.

Figure 3:
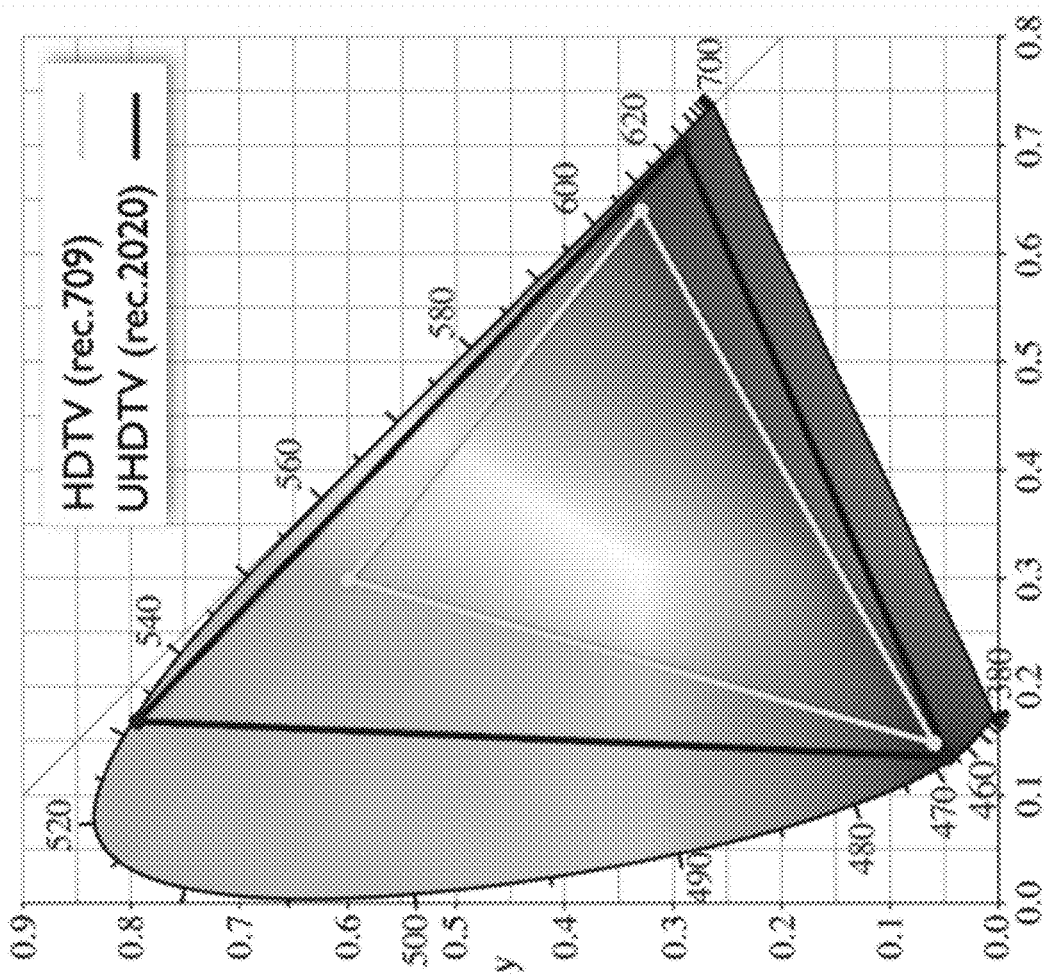
FIG. 3 illustrates an example graph comparing HDTV and UHDTV in CIE color definition
Figure 4A:
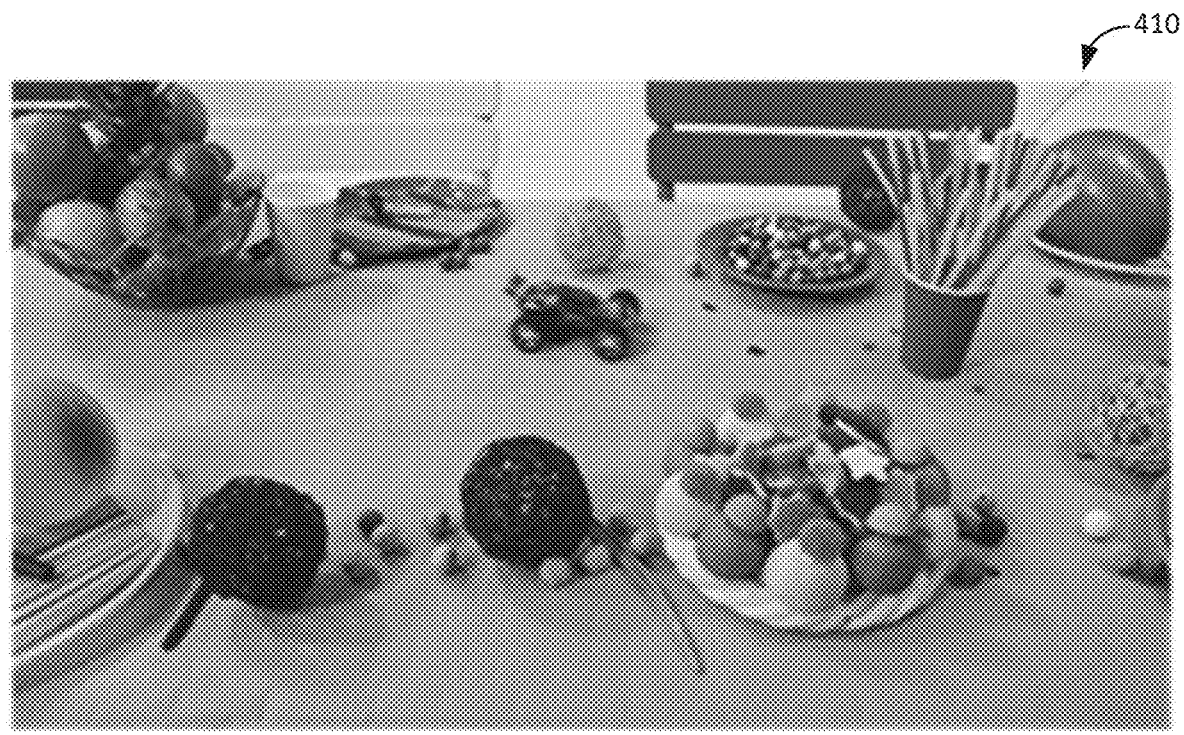
FIG. 4A shows an example image.
Figure 4B:
FIG. 4B shows another example image.

In an embodiment, an Ultra high definition TV (UHDTV) specification may be used to present images and video using advanced display technologies. Compared to the High Definition TV (HDTV) specification, a UHDTV specification may support larger spatial resolution, a higher frame-rate, a higher sample bit depth, and/or a wider color gamut. User experience may be improved due to the higher fidelity and higher picture quality that UHDTV may provide. UHDTV may support two spatial resolutions, one at 4K (3840×2160) and one at 8K (7680×4320), frame rates up to 120 Hz, and/or two bit depths of picture samples at 10 bits and 12 bits. In addition, the color space of UHDTV may support rendering of a larger volume of visible color information. FIG. 3 shows graph 300 illustrating a comparison between HDTV and UHDTV in International Commission on Illumination (CIE) color definition. FIG. 4 shows an example of the visual difference that may be perceived by an end user between the HDTV color gamut and the UHDTV color gamut. In FIG. 4, a same content is color graded twice using different color spaces. FIG. 4A shows image 410 that may represent an image that may have been color graded in HDTV and rendered/displayed on an HDTV display. FIG. 4B shows image 410 that may represent an image that may have been color graded in UHDTV and rendered/displayed on a HDTV display.

SHVC may support HDTV to UHDTV migration. Efficient coding technologies designed for bit depth scalability and/or color gamut scalability may be included into SHVC. Table 1 below lists different types of scalabilities that SHVC may support according to the disclosed embodiments. One or more of such scalability types may also be supported by the previous SVC standard.

TABLE 1

SHVC scalability types

| Scalability | Example | Standards |
| --- | --- | --- |
| Spatial scalability | 720 p→1080 p | SVC, SHVC |
| Quality (SNR) scalability | 35 dB→38 dB | SVC, SHVC |
| Temporal scalability | 30 fps→60 fps | SVC, HEVC |
| Standards scalability | H.264/AVC→HEVC | SHVC |
| Bit-depth scalability | 8-bit video → 10-bit video | SHVC |
| Color gamut scalability | BT.709(HDTV) −> BT.2020(UHDTV) | SHVC |

A type of scalability may be referred to as color gamut scalability. Color gamut scalable (CGS) coding may be multi-layer coding where two or more layers may have different color gamuts. For example, as shown in Table 1, in a 2-layer scalable system, a base layer may be an HDTV color gamut while an enhancement layer may be a UHDTV color gamut. Inter-layer processing for CGS coding may use color gamut conversion methods to convert the base layer color gamut to an enhancement layer color gamut. Inter-layer reference pictures generated by color gamut conversion (e.g., color mapping) methods may be used to predict the enhancement layer pictures with improved accuracy. Using the pictures shown in FIG. 4 as an example, a color gamut conversion process may significantly reduce and/or alleviate the color differences between the images shown in FIG. 4A and FIG. 4B that may be due to different color grading. Through the use of color gamut conversion methods, the colors in HDTV space may be translated into the UHDTV space and may be used to predict an enhancement layer signal in the UHDTV space.

Figure 5:
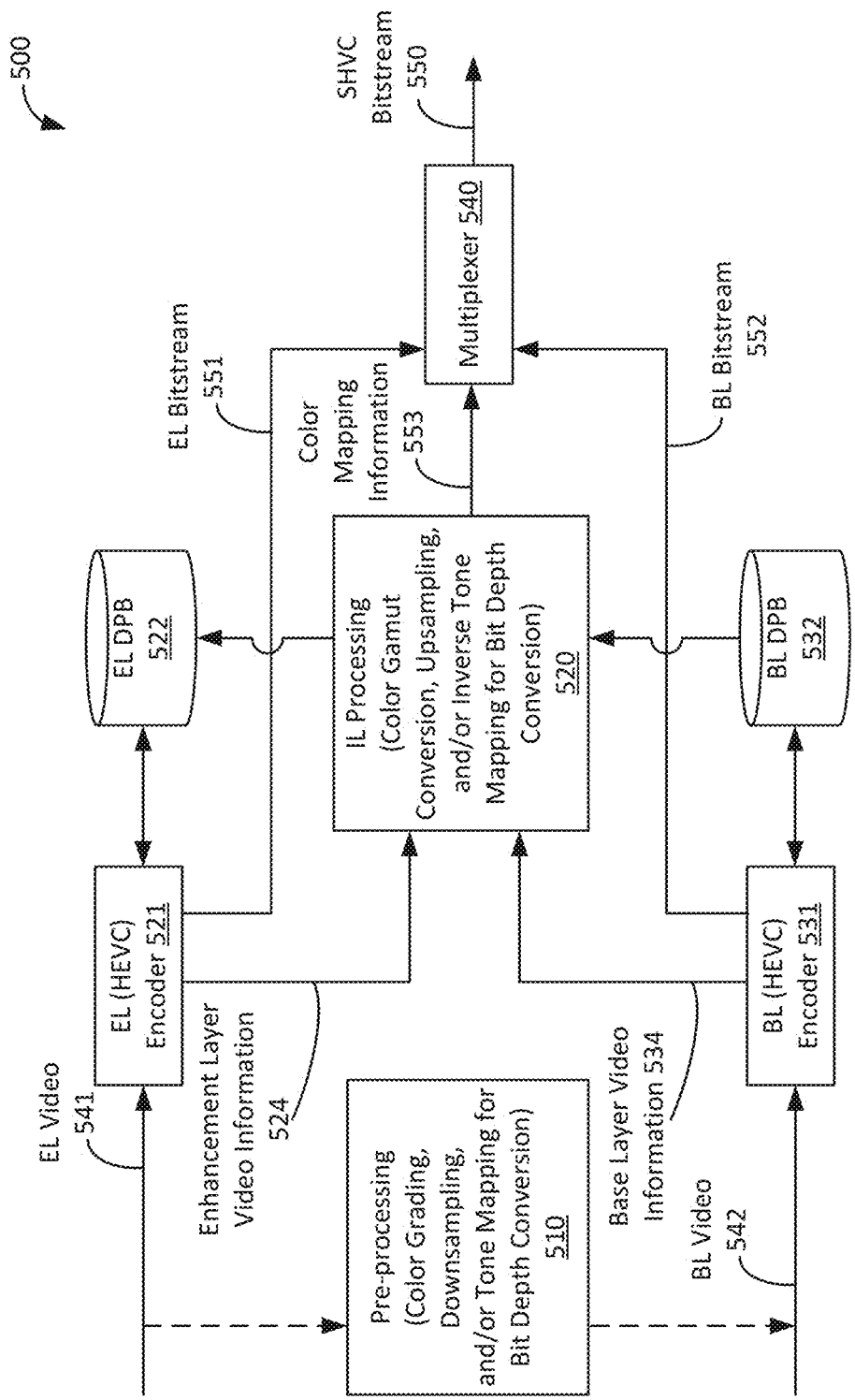
FIG. 5 illustrates an example system for implementing the disclosed embodiments.

FIG. 5 shows block diagram 500 of an exemplary SHVC encoder that may correspond to an SHVC decoder such as the exemplary SHVC decoder of FIG. 2. Enhancement layer (EL) video 541 may be provided to EL encoder 521 that may be an HEVC encoder or a component thereof in an embodiment. Base layer (BL) video 542 may be provided to BL encoder 531 that may be an HEVC encoder or a component thereof in an embodiment. EL video 541 may have undergone pre-processing 510 for color grading, downsampling, and/or tone mapping for bit depth conversion to generate BL video 542. EL encoder 521 may provide pictures to EL DPB 522 and BL encoder 531 may provide pictures to BL DPB 532.

As shown, exemplary inter-layer (IL) processing module 520 may perform color gamut conversion from base layer color gamut to enhancement layer color gamut, upsampling from base layer spatial resolution to enhancement layer spatial resolution, and/or inverse tone mapping from BL sample bit-depth to EL sample bit-depth. Such processing may be performed using enhancement layer video information 524 and/or base layer video information 534 that may have been provided by EL encoder 521 and BL encoder 531, respectively. IL processing module 520 may use picture(s) from BL DPB 532 in its processing and/or may provide data, pictures, or other information to EL DPB 522 for use in predicting EL pictures. Color mapping information 553 generated by IL processing module 520 may be provided to multiplexer 540.

Multiplexer 540 may use EL bitstream 551 generated by EL encoder 521 and BL bitstream 552 generated by BL encoder 531 to generate SHVC bitstream 550. In an embodiment, multiplexer 540 may also use color mapping information 553 to generate SHVC bitstream 550.

Various color gamut conversion methods may be used, including, but not limited to, linear, piece-wise linear, and polynomial. In the film industry and post-production processes, a 3-Dimensional Look-up Table (3D LUT) may be used for color grading and/or color gamut conversion from one gamut to another. A 3D LUT-based color gamut conversion process may be used in SHVC as an inter-layer prediction method for CGS coding as described herein.

Figure 6:
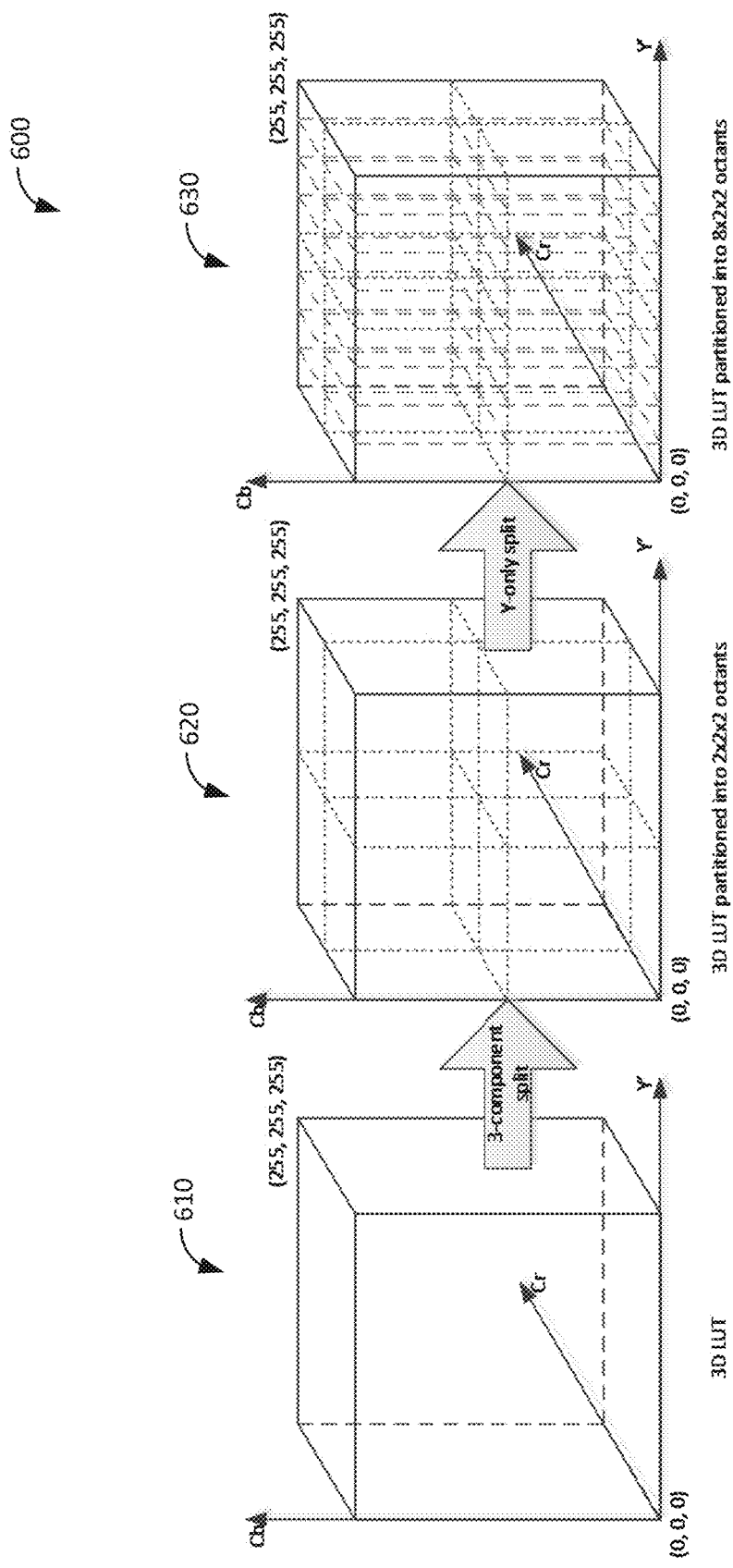
FIG. 6 illustrates an example 3D LUT-based mapping according to an embodiment.

An SHVC color mapping process may be based on a 3D LUT. FIG. 6 shows example 3D LUT based mapping 600 that may be a mapping from 8-bit BL video to 8-bit EL video with a range of (0, 0, 0) to (255, 255, 255). Using a 3D color mapping table, 3D LUT 610 may first be split evenly in each dimension (center cube) into 2×2×2 octants at 620. An SHVC profile (e.g., SHVC Scalable Main 10 profile) may allow at most one split in the three color dimensions. A luma component may be additionally split into, in some embodiments, at most four parts as shown in 630. A 3D color space may be split into up to 8×2×2 cuboid-shaped octants. Within an octant, a cross color component linear model may be applied to perform color mapping. For an octant, four vertices may be transmitted to represent the cross component linear model. The color mapping table may be transmitted separately for the Y', Cb, and Cr components. Thus, up to 8×2×2×4×3=384 table entries may be stored for CGS coding.

Figure 7:
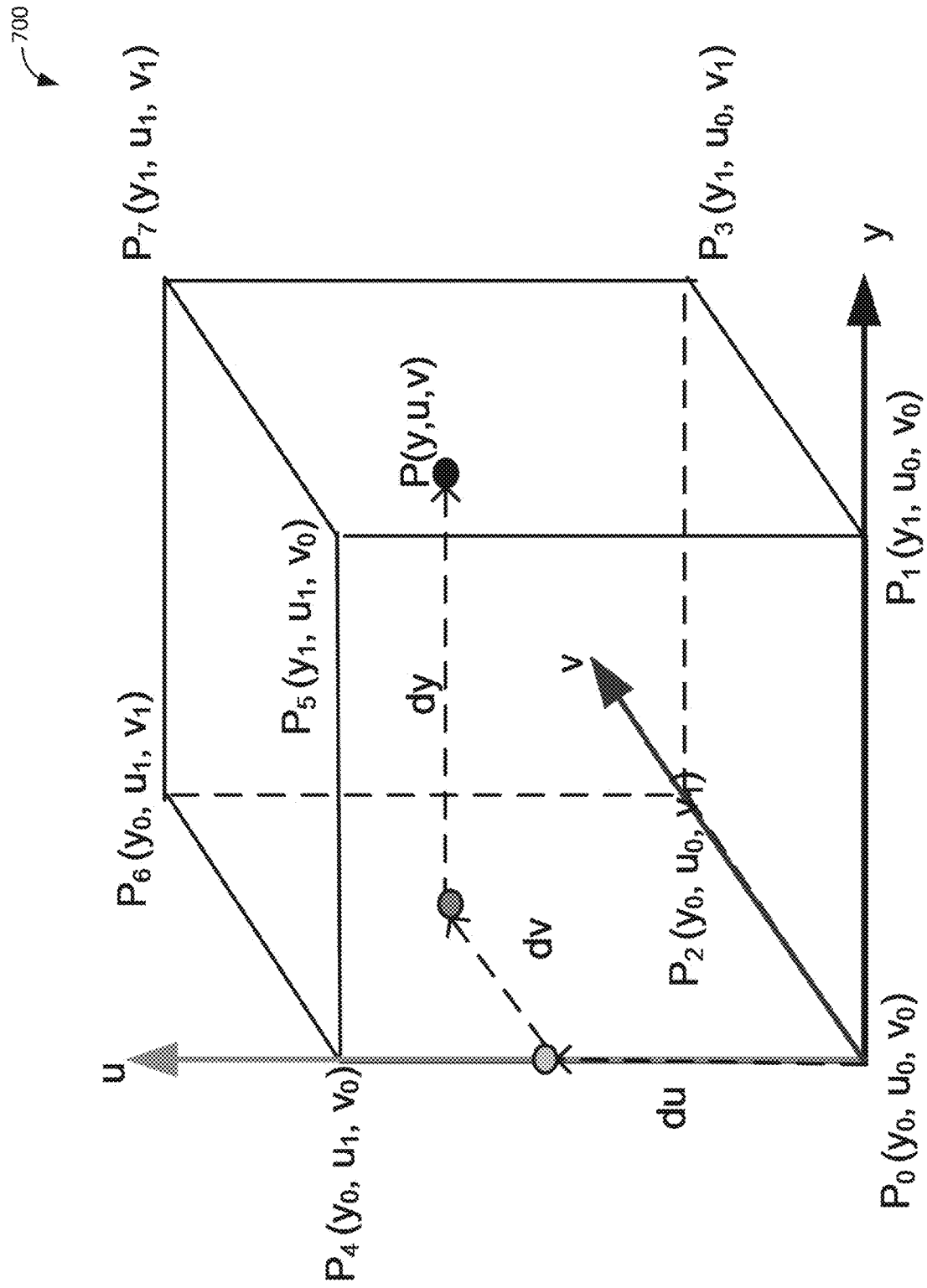
FIG. 7 illustrates an example 3D LUT-based mapping according to an embodiment.

To perform color mapping in SHVC, for a given BL input sample triplet P(y, u, v), located as shown in example cube 700 of FIG. 7, the octant to which it belongs may be determined based on the values of the first N most significant bits (MSBs) of the color components (y, u, v) because a color dimension is partitioned dyadically.

Because luma and the chroma samples may not be phase aligned in the typical YCbCr 4:2:0 video format, the input P(y, u, v) may be filtered with 4-tap or 2-tap filters to align the luma and chroma sample locations.

The linear model for the color component C (C may be Y, U, or V) of the identified octant may be denoted as $lutC[P_0]$, $lutC[P_4]$, $lutC[P_6]$, and $lutC[P_7]$, which may correspond to the vertices $P_0$, $P_4$, $P_6$, and $P_7$ as shown in FIG. 7. Accordingly, the output of the color component C of the color mapping process may be calculated using equation (1) below, with dy, du, and dv as indicated in FIG. 7. Where there is a spatial resolution difference between the BL and the EL, up-sampling may be applied after color mapping.

$$C_{out} = lutC[P_0] + dy \times (lutC[P_7] - lutC[P_6]) + du \times (lutC[P_4] - lutC[P_0]) + dv \times (lutC[P_6] - lutC[P_4]) \quad (1)$$

3D LUT parameters may be estimated by an encoder, for example, using a BL signal in one color space and an EL signal in another color space. The Least Square (LS) estimation method may be utilized to estimate optimal 3D LUT parameters. These model parameters may include the size of the 3D LUT (e.g., a number of partitions of the chroma components and a number of partitions of the luma component) and/or linear model parameters at vertices $P_0$, $P_4$, $P_6$, and $P_7$ for an octant. In SHVC, these LUT parameters may be signaled in a bitstream inside a Picture Parameter Set (PPS) such that the decoder may perform the same color gamut conversion process. PPS may carry parameters that are relatively static and that may not change frequently from picture to picture. PPS update at a picture level may be used, allowing 3D LUT parameters to be signaled at a sequence level and updated at a picture level. In order to reduce the 3D LUT signaling cost, the model parameters at, e.g., the vertices $P_0$, $P_4$, $P_6$, and $P_7$ for an octant may be predicted from their neighboring octants.

The number of bits used to signal model parameters of a 3D LUT may vary greatly based on the size of the 3D LUT. The larger the 3D LUT may be (e.g., the more partitions of the 3D LUT), the more bits it may consume. A larger 3D LUT may provide a finer partition of a color space, such as that represented by 630 in FIG. 6. The use of a larger 3D LUT may reduce distortion between an original EL signal and a color mapped BL signal and/or may increase the coding efficiency of the EL.

An intelligent encoder may select or determine a 3D LUT size, taking into consideration a tradeoff between signaling overhead of a 3D LUT and the 3D LUT's distortion reduction capabilities. For example, a rate distortion optimization method may be used to select an appropriate 3D LUT size. In an embodiment, a 3D LUT size may be selected by taking into consideration (e.g., only) a relative signaling overhead using pre-selected thresholds. In an embodiment, a 3D LUT size may be reduced when the signaling cost of the 3D LUT is over a threshold (e.g., 3%) of a previously coded picture and increased when its signaling cost is below a threshold (e.g., 0.5%) of a previously coded picture.

In an embodiment, an improved 3D LUT size selection method based on rate distortion cost may be used as set forth herein. By considering the rate distortion cost of the 3D LUT sizes that may satisfy a maximum size constraint, the disclosed embodiments may determine a 3D LUT size (and, in an embodiment, its associated vertex parameters) that achieves a desired overhead vs. distortion reduction tradeoff. A hierarchical B prediction structure may be taken into account when calculating the rate distortion cost of 3D LUT tables.

Model parameters associated with $P_0$, $P_4$, $P_6$, and $P_7$ for an octant may be predicted using vertex values from a neighboring octant on the left. For a color component X, with X being Y, U, or V, two predictors, predXa and predXb, may be calculated. The difference between the actual model parameters and the associated predictors may be calculated and signaled in the bitstream.

The first predictor predXa may be calculated as the octant coordinates with, in some embodiments, proper bit shift. Proper bit shift may be used when the input and output of the 3D LUT have different bit depths. For example, when the BL signal is 8-bit and the EL signal is 10-bit, a bit shift of 2 may be used. The first predictor may be calculated for $P_0$, $P_4$, $P_6$, and $P_7$ for all octants. More specifically, predictor predXa, for X being Y, U, or V, may be calculated using equations (2), (3), and (4) shown below.

$$\text{predYa}[y\text{Idx}][u\text{Idx}][v\text{Idx}][\text{vertex}]=(\text{vertex}<3)?\\(y\text{Idx}<<y\text{Shift}):((y\text{Idx}+1)<<y\text{Shift}) \quad (2)$$

$$\text{predUa}[y\text{Idx}][u\text{Idx}][v\text{Idx}][\text{vertex}]=(\text{vertex}==0)?\\(u\text{Idx}<<c\text{Shift}):((u\text{Idx}+1)<<c\text{Shift}) \quad (3)$$

$$\text{predVa}[y\text{Idx}][u\text{Idx}][v\text{Idx}][\text{vertex}]=(\text{vertex}<2)?\\(v\text{Idx}<<c\text{Shift}):((v\text{Idx}+1)<<c\text{Shift}) \quad (4)$$

In equations (2), (3), and (4), yIdx, uIdx, and vIdx may be indices in the Y, U, and V dimensions that may be used to identify an octant and a vertex equal to 0, 1, 2, 3 may indicate the vertices $P_0$, $P_4$, $P_6$, and $P_7$, respectively.

The second predictor predXb may be calculated as a difference between model parameters for a left neighboring octant and a first predictor predA of the left neighboring octant. More specifically, the second predictor predXb, for X being Y, U, or V, may be derived as shown in the following example pseudocode section.

```
if (yIdx > 0)
    predXb[yIdx][uIdx][vIdx][vertex] = Clip3(
      -  (1 << (CMOutputBitdepth_{Y/C} - 2)),
         (1 << (CMOutputBitdepthY/C - 2)),
         LutX[yIdx - 1][uIdx][vIdx][vertex] - predXa[yIdx -
         1][uIdx][vIdx][vertex])
else
    predXb[yIdx][uIdx][vIdx][vertex] = 0
```

The first predictor predXa and the second predictor predXb may be used to predict the model parameters of the current octant. The prediction errors may be calculated by subtracting predXa and predXb from model parameters of a current octant. Prediction errors may be quantized with cm_res_quant_bits. At the decoder side, model parameters for an octant, which may be denoted as LutX [yIdx][uIdx][vIdx][vertex], with X being Y, U, or V, may be derived using the following equation (5):

$$\text{LutX}[y\text{Idx}][u\text{Idx}][v\text{Idx}][\text{vertex}]=(\text{res}\_x[y\text{Idx}][u\text{Idx}]\\ [v\text{Idx}][\text{vertex}]<<\text{cm\_res\_quant\_bits})+\text{predXa}\\ [y\text{Idx}][u\text{Idx}][v\text{Idx}][\text{vertex}]+\text{predXb}[y\text{Idx}][u\text{Idx}]\\ [v\text{Idx}][\text{vertex}] \quad (5)$$

where res_x, for x being replaced by Y, U, or V, may be a quantized prediction error that may be signaled in a bitstream.

Due to quantization of prediction error, using a model parameter prediction method, the derived model parameters LutX[yIdx][uIdx][vIdx][vertex] may have zero bits in the cm_res_quant_bits of the Least Significant Bit (LSB) positions. This may affect the precision of the color mapping process. As set forth herein, a vertex prediction method for CGS coding may allow the LSB positions of the derived model parameters LutX[yIdx][uIdx][vIdx][vertex] to have non-zero values and hence improved precision for a color mapping process.

In an embodiment, for a given table size s, an associated rate distortion cost may be calculated using equation (6) as follows:

$$J_{cost}(s)=D(s)+\lambda \cdot \text{bits}(s) \quad (6)$$

where D(s) may be a distortion between an original EL signal and a mapped BL signal after color mapping using a 3D LUT with size s applied, bits(s) may be a number of bits used to code the 3D LUT with size s, and λ may be a Lagrange multiplier. The optimal table size may be selected using equation (7) as follows:

$$s^{opt}=\arg\min(J_{cost}(s)). \quad (7)$$

As video resolution increases, overall distortion (which may be calculated as a sum of distortion of all the pixels in a picture) may fluctuate more significantly and may overpower the second term λ·bits(s) in equation (6), unless a very large λ is selected. This may result in the selection of a larger than desired table size more frequently. Another result may be the changing of a selected 3D LUT size more frequently from picture to picture, which may result in more frequent PPS updates. As set forth herein, the disclosed ILR usage based weighted distortion calculation may be used.

Figure 8:
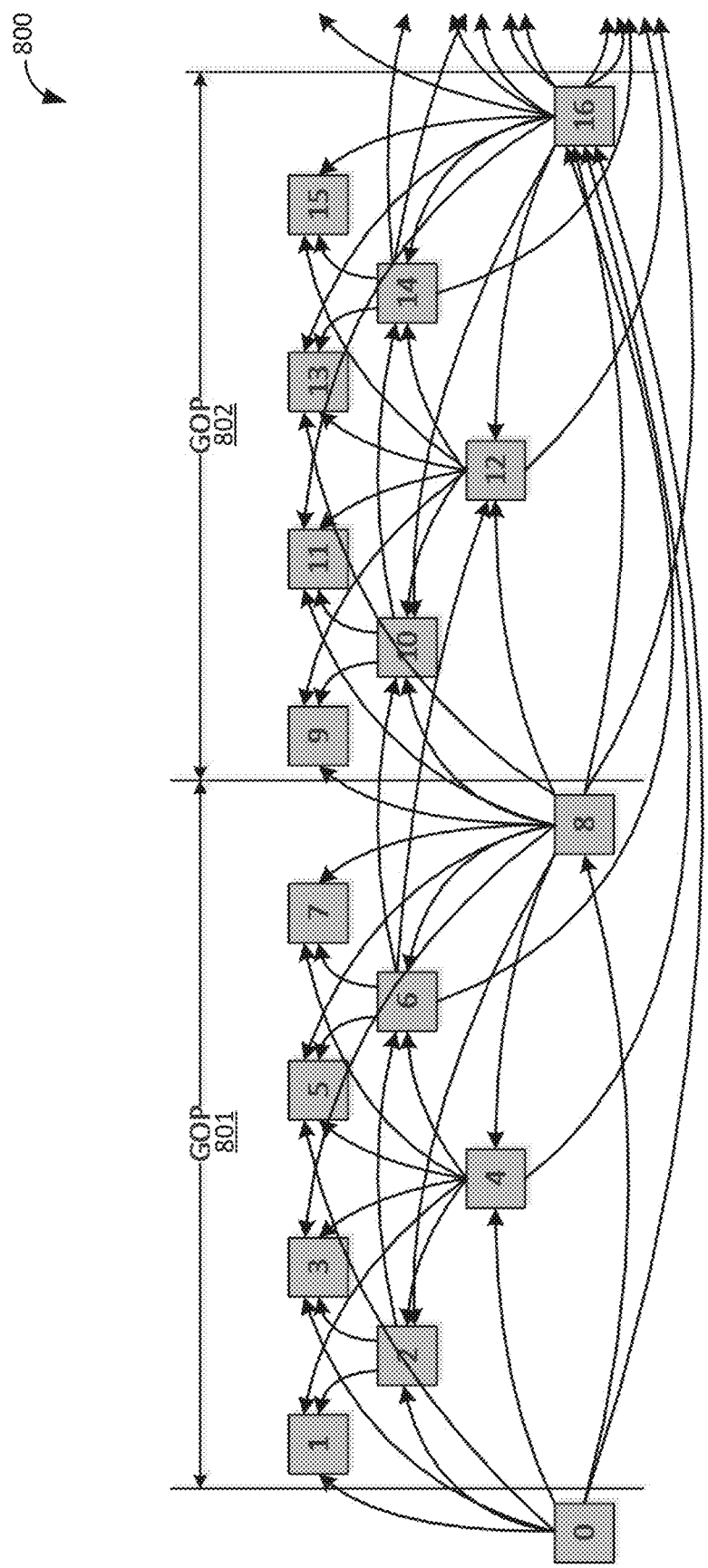
FIG. 8 illustrates an example prediction structure according to an embodiment.

FIG. 8 illustrates example hierarchical B prediction structure 800 that may be used for streaming and broadcasting video applications. Starting from a Random Access Point (RAP), depicted in FIG. 8 as picture 0, pictures may be coded out of order (e.g., in an order that is varies from a display order) using a hierarchical B prediction structure such as structure 800. With a Group of Pictures (GOP) of size 8 for each of GOP 801 and 802 as shown in FIG. 8, every 8 pictures may be grouped together and nay be coded out of display order. For example, a coding order may be applied to GOP 801 such that GOP 801 may include pictures 0, 1, 2, 3, 4, 5, 6, 7, and 8 followed by GOP 802 that may include pictures 9, 10, 11, 12, 13, 14, 15, and 16. Within GOP 801, a coding order of the pictures may be picture 0, picture 8, picture 4, picture 2, picture 1, picture 3, picture 6, picture 5, and picture 7, while within GOP 802 a coding order of the pictures may be picture 16, picture 12, picture 10, picture 9, picture 11, picture 14, picture 13, and picture 15.

The arrows in FIG. 8 show the temporal reference pictures used to predict a picture. For example, picture 0 may be used to predict pictures 1, 2, 3, 4, 8, and 16, while picture 4 may be used to predict pictures 1, 2, 3, 5, 6, 7, and 16, etc. The temporal distance between reference pictures and a current picture may vary depending on where the current picture is located within a prediction hierarchy. For example, for picture 8 and picture 16 at the bottom of prediction hierarchy 800, the temporal distance between these pictures and their respective reference pictures may be large. For example, picture 8 may have as its reference picture 0. For each of pictures 1, 3, 5, 7 and so on, which are at the top of exemplary prediction hierarchy 800, the temporal distance between each of these pictures and their respective reference pictures may be very small. For example, picture 3 may include among its references pictures 2 and 4 that may be temporally adjacent pictures. The temporal distance between a reference picture and a current picture that the reference picture may be used to predict may affect the usage of the given reference picture. In an embodiment, the closer a reference picture is to a current picture, the more likely it may be used to predict the current picture. As shown in FIG. 8, the prediction hierarchy may determine how far the temporal reference pictures are from a current picture, and thus may determine the usage of these temporal reference pictures.

Figure 9:
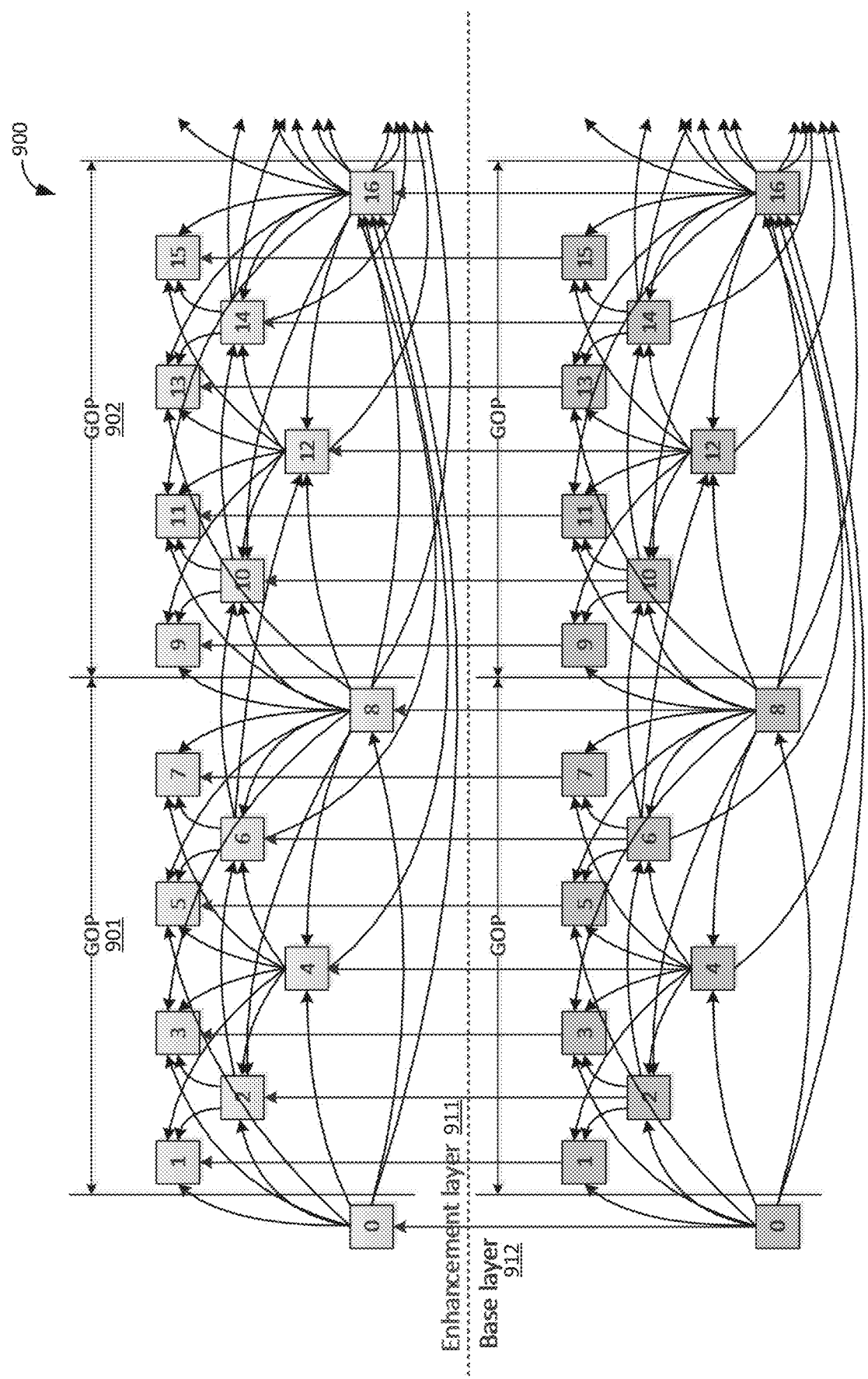
FIG. 9 illustrates another example prediction structure according to an embodiment.

FIG. 9 illustrates hierarchical B temporal prediction structure 900 that may be extended to a 2-layer scalable video coding system. Inter-layer reference (ILR) pictures may be available for prediction of a current picture, for example, as shown by the vertical arrows connecting pictures in base layer 912 to pictures in enhancement layer 911. For example, picture 2 in base layer 912, GOP 901 may be connected by a vertical arrow to picture 2 in enhancement layer 911, GOP 901, illustrating that picture 2 in base layer 912, GOP 901 may be available for prediction of picture 2 in enhancement layer 911, GOP 901. Inter-layer reference pictures and temporal reference pictures may be used for the prediction of the current picture. The usage of an inter-layer reference picture may be directly related to a prediction hierarchy. For example, for low temporal level pictures in enhancement layer 911 that may not have temporal reference pictures close to themselves (e.g., picture 8 in enhancement layer 911, GOP 901 of structure 900), the usage of ILR pictures may be higher. The usage of ILR pictures for high temporal level pictures in enhancement layer 911 (e.g., picture that may have temporally adjacent reference pictures, such as picture 3 in enhancement layer 911, GOP 901 of structure 900) may be lower. Weights based on ILR picture usage may be determined and applied to distortion term D(s) of equation (6) such that the impact of choosing different 3D LUT model parameters may be estimated more accurately. That is, the rate distortion cost in equation (6) may be modified as shown in equation (8):

$$J_{cost}(s) = w \cdot D(s) + \lambda \cdot bits(s) \quad (8)$$

where w may be a weighting factor based on ILR picture usage. In an embodiment, different weights may be applied depending on a temporal level of a current picture being coded. Where l may be the temporal level of the current picture, the weighting factor may be denoted as w(l). In an embodiment, w(l) may be fixed for an entire video sequence. Alternatively, adaptive weights w(l) may be maintained and updated dynamically based on the actual ILR picture usage for pictures in temporal level l.

Figure 10:
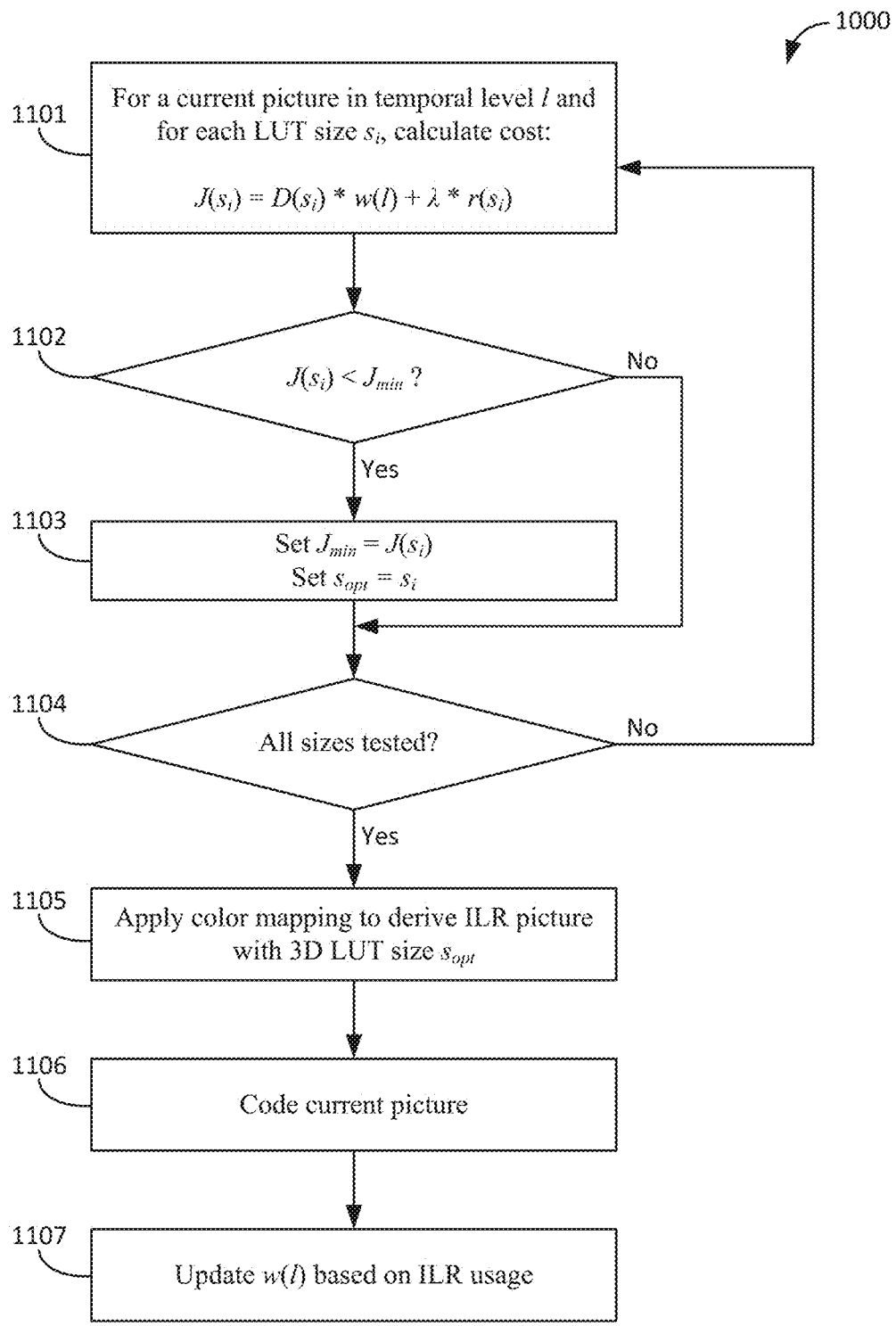
FIG. 10 illustrates an example method of implementing the disclosed embodiments.

ILR picture usage may be dependent on the video content being coded. In an embodiment, dynamic updating of w(l) may allow better content adaptation. FIG. 10 illustrates example process 1000 of selecting an optimal size based on rate distortion optimization using weighted distortion. At 1101, for a current picture in a temporal level l, a cost $J(s_i)$ may be calculated for a LUT size $s_i$ using equation 9:

$$J(s_i) = D(s_i) * w(l) + \lambda * r(s_i) \quad (9)$$

where l may represent a temporal level of a current picture, a weighting factor may be denoted as w(l), $D(s_i)$ may be a distortion, λ may be a Lagrange multiplier, and $r(s_i)$ may be a number of coding bits for a LUT size $s_i$.

At 1102, a determination may be made as to whether the cost $J(s_i)$ determined at 1101 is less than a minimum cost threshold $J_{min}$. If so, at 1103, the minimum cost threshold $J_{min}$ may be set to the cost $J(s_i)$ determined at 1101 and the optimal table size $s_{opt}$ may be set to the current table size $s_i$. If the cost determined at 1101 is greater than or equal to a minimum cost threshold $J_{min}$, or after performing the functions of 1103 if the cost $J(s_i)$ is less than minimum cost threshold $J_{min}$, the method moves to 1104 where it may be determined whether some or all LUT sizes have been tested. If the LUT sizes have not been tested, process 1000 returns to 1101 to perform further testing.

If the LUT sizes have been tested, at 1105, a color mapping may be applied to derive an ILR picture using the 3D LUT size $s_{opt}$ as most recently determined or set. At 1106 a current picture may be coded using the determined information and at 1107 w(l) may be updated based in ILR usage.

Additional considerations may be used when determining an optimal 3D LUT size to improve performance and/or to reduce encoder complexity. In an embodiment, ILR usage w(l) may also be tracked for a picture or a slice type at a temporal level. For example, a weighting factor may be tracked as w(l, t), where l may be the temporal level and t may be the picture/slice type (e.g., t may be I_SLICE, P_SLICE, or B_SLICE). Because coded EL pictures may also be used to encode other future EL pictures in coding order, rate distortion based 3D LUT parameter selection may also depend on an impact of a current picture for coding of future EL pictures. For example, for non-reference pictures in an EL, picture level updates of 3D LUT may be disabled because of increased quality of non-reference EL pictures (e.g., due to more accurate color mapping) may not benefit any other pictures. Picture level 3D LUT updates may be disabled for pictures at a temporal level above a certain threshold. For example, picture level 3D LUT updates may be disabled for the pictures in the two highest temporal levels. For example, in FIG. 9, picture level 3D LUT updates may not be applied to any odd numbered pictures or pictures 2, 6, 10, and 14.

In HEVC, following a, or each, Clean Random Access (CRA) picture, there may be pictures that are earlier in display order and later in coding order, and that may not be decodable if pictures in the previous Random Access Period are discarded. This may occur, for example, when a user switches channels. These pictures may be referred to as the Random Access Skipped Leading (RASL) pictures in HEVC. In an embodiment, picture level 3D LUT update may be disabled for RASL pictures.

In an embodiment, given a maximum 3D LUT size, some or all 3D LUT sizes that are smaller than the maximum size may not be considered. For example, the number of bits used to code each picture (e.g., for each picture type at each temporal level) and the number of bits used to code 3D LUT (e.g., for each 3D LUT size smaller than the maximum) may be tracked. If a given 3D LUT size is expected to generate a signaling overhead larger than a certain percentage threshold (for example, 25%) of the number of bits expected to code the current picture, then this 3D LUT size may be excluded from the rate distortion decision of process 1000 in FIG. 10.

Referring again to FIG. 7, vertex positions of an octant may be labeled from $P_0$ to $P_7$. Some vertices may be shared between neighboring octants. For example, the vertex position $P_0$ of a current octant may be at the same position as $P_1$ in a left neighboring octant, the vertex position $P_4$ of a current octant may be at a same position as $P_5$ in a left neighboring octant, and so on. Consider vertex position $P_0$ of a current octant as shown in FIG. 7, for example. Using model parameters received for a left neighboring octant, parameter values of the vertex position of $P_1$ of the left neighboring octant may be derived. For example, for color component X, with X being Y, U, or V, the following example pseudocode section may be used to derive the value of $P_1$ of the left neighboring octant. (yIdx, uIdx, vIdx) as shown in the section below may be an index of a current octant to be coded.

---
deltaY = octantLengthY
deltaU = 0
deltaV = 0
valueXP1 = LutX[yIdx−1][uIdx][vIdx][0] + ((((deltaY * (LutX[yIdx−1][uIdx][vIdx][3] − LutX[yIdx − 1][uIdx][vIdx][2])) << cShift2Idx) + ((deltaU * (LutX[yIdx−1][uIdx][vIdx][1] − LutX[yIdx − 1][uIdx][vIdx][0])) << yShift2Idx) + ((deltaV * (LutX[yIdx−1][uIdx][vIdx][2] − LutX[yIdx − 1][uIdx][vIdx][1])) << yShift2Idx) + nMappingOffset) >> nMappingShift)
---

This derived value valueXP1 may be used as a predictor for the vertex $P_0$ of the current octant. The prediction error may be calculated using this predictor valueXP1. The prediction error may be quantized using the factor cm_res_quant_bits. At a decoder, the model parameter for $P_0$ of the current octant may be calculated by adding valueXP1 to the de-quantized prediction error, as shown in the following equation (10):

$$LutX[yIdx][uIdx][vIdx][0]=(res[yIdx][uIdx][vIdx][vertex]<<cm\_res\_quant\_bits)+valueXP1 \quad (10)$$

Although the quantized prediction error may have zero values in cm_res_quant_bits LSB positions, the predictor valueXP1 may not. Therefore, derived model parameters for a vertex position $P_0$ of a current octant, LutX[yIdx][uIdx][vIdx][0], may have improved precision.

Although the embodiments set forth herein may be discussed using vertex $P_0$ of a current octant as an example, predictors for remaining vertices $P_4$ and $P_6$ may be derived in a similar manner. For a vertex position $P_7$, external interpolation instead of internal interpolation may be used because $P_7$ may not be a shared vertex with a left neighboring octant. However, external interpolation may not produce good quality predictions because a 3D LUT may be trained based on internal interpolation (e.g., only on internal interpolation). In an embodiment, prediction of model parameters for $P_7$ may be calculated from vertex $P_6$ of a current octant. The correlation between Y and U may be weaker than the correlation between Y and V for UHDTV color space. Therefore, a luma component difference between $P_7$ and $P_6$ in its neighboring octant with octant index (yIdx, uIdx−1, vIdx) may be derived. This derivation process may be performed as shown below in the following example sections of pseudocode.

If uIdx is greater than 0, then valueXP7 may be calculated as:

---
valueYP7 = LutY[yIdx][uIdx][vIdx][2] + (LutY[yIdx][uIdx−1][vIdx][3] − LutY[yIdx][uIdx−1][vIdx][2])
valueUP7 = LutU[yIdx][uIdx][vIdx][2]
valueVP7 = LutV[yIdx][uIdx][vIdx][2] .
---

Otherwise, valueXP7 may be calculated as:

---
valueYP7 = LutY[yIdx][uIdx][vIdx][2] + (octantLengthY<<(CMOutputBitdepthC−CMInputBitdepthC))
valueUP7 = LutU[yIdx][uIdx][vIdx][2]
valueVP7 = LutV[yIdx][uIdx][vIdx][2] .
---

In an embodiment, instead of using a left neighboring octant (e.g., an octant with octant index (yIdx−1, uIdx, uIdx)) to predict model parameters for a current octant, other neighboring octants may be used. For example, the octants with octant index (yIdx, uIdx−1, vIdx), (yIdx, uIdx, vIdx−1), (yIdx−1, uIdx−1, vIdx), (yIdx−1, uIdx, vIdx−1), (yIdx, uIdx−1, vIdx−1), and/or (yIdx−1, uIdx−1, vIdx−1) may be used. The predictors may also be calculated by combining two or more predictors from these neighboring octants to further improve precision.

In an embodiment, an entropy coding method for 3D LUT parameters may be implemented as described herein. A prediction residual value may be denoted as resCoeff. resCoeff may be coded by Exp-Golomb coding of the MSB of the absolute value of resCoeff, 7-bit fixed-length coding of the remaining LSB of the absolute value of resCoeff, and setting a one bit flag for the sign if the absolute value of resCoeff is non-zero. More specifically, Table 2 below is a syntax table followed by semantics that may be used in an embodiment, in which res_coeff_q may represent the MSB, res_coeff_r may represent the LSB, and res_coeff_s may represent the sign.

TABLE 2

Entropy Coding Syntax Table

| | Descriptor |
|---|---|
| color_mapping_octants( depth, yIdx, uIdx, vIdx, length ) { [Ed. (MH): Camel casing suggested for all input parameters, i.e. depth and length should be changed.] | |
|     if ( depth < cm_octant_depth ) | |
|         split_octant_flag | u(1) |
|     if ( split_octant_flag ) | |
|         for( k = 0; k < 2; k++ ) | |
|             for( m = 0; m < 2 ; m++ ) | |
|                 for( n = 0; n < 2; n++ ) | |
|                       color_mapping_octants( depth + 1, yIdx + YPartNum * k * length / 2, uIdx + m * length / 2, vIdx + n * length / 2, length / 2) | |
|     else | |
|         for( i = 0; i < YPartNum; i++ ) | |
|             for( j = 0; j < 4; j++ ) { | |
|                 coded_res_flag[ yIdx + (i << (cm_octant_depth-depth)) ][ uIdx ][ vIdx ][ j ] | u(1) |
|                 if( coded_res_flag[ yIdx + (i << (cm_octant_depth-depth)) ][ uIdx ][ vIdx ][ j ] ) | |
|                     for( c = 0; c < 3; c++ ) { | |
|                         res_coeff_q[ yIdx + (i << (cm_octant_depth-depth)) ][ uIdx ][ vIdx ][ j ][ c ] ) | ue(v) |
|                         res_coeff_r[ yIdx + (i << (cm_octant_depth-depth)) ][ uIdx ][ vIdx ][ j ][ c ] ) | u(7) |
|                         if( res_coeff_q[ yIdx + (i << (cm_octant_depth-depth)) ][ uIdx ][ vIdx ][ j ][ c ] | | res_coeff_r[ yIdx + (i << (cm_octant_depth-depth)) ][ uIdx ][ vIdx ][ j ][ c ]) | |
|                             res_coeff_s[ yIdx + (i << (cm_octant_depth-depth)) ][ uIdx ][ vIdx ][ j ][ c ] ) | u(1) |
|                     } | |
|             } | |
| } | |

In Table 2, res_coeff_q[yIdx][uIdx][vIdx][i][c] may specify a quotient of a residual for a color mapping coefficient with index [yIdx][uIdx][vIdx][i][c]. When not present, the value of res_coeff_q may be inferred to be equal to 0.

In Table 2, res_coeff_r[yIdx][uIdx][vIdx][i][c] may specify a remainder of a residual for a color mapping coefficient with index [yIdx][uIdx][vIdx][i][c]. When not present, the value of res_coeff_q may be inferred to be equal to 0.

In Table 2, res_coeff_s [yIdx][uIdx][vIdx][pIdx][cIdx] may specify a sign of a residual for a color mapping coefficient with index [yIdx][uIdx][vIdx][i][c]. When not present, the value of res_coeff_s may be inferred to be equal to 0.

In order to reconstruct the value of resCoeff, res_coeff_q, res_coeff_r, and res_coeff_s may be assembled together. More specifically, the following decoding process may be used to reconstruct a prediction residual for a color component, a parameter, and an octant.

The variables CMResY[yIdx][uIdx][vIdx][i], CMResU [yIdx][uIdx][vIdx][i] and CMResV[yIdx][uIdx][vIdx][i] may be derived using equations 11, 12, and 13, respectively, as follows:

$$CMResY[yIdx][uIdx][vIdx][i]=(1-2*res\_coeff\_s[yIdx][uIdx][vIdx][i][0])*((res\_coeff\_q[yIdx][uIdx][vIdx][i][0]<<7)+res\_coeff\_r[yIdx][uIdx][vIdx][i][0]) \quad (11)$$

$$CMResU[yIdx][uIdx][vIdx][i]=(1-2*res\_coeff\_s[yIdx][uIdx][vIdx][i][1])*((res\_coeff\_q[yIdx][uIdx][vIdx][i][1]<<7)+res\_coeff\_r[yIdx][uIdx][vIdx][i][1]) \quad (12)$$

$$CMResV[yIdx][uIdx][vIdx][i]=(1-2*res\_coeff\_s[yIdx][uIdx][vIdx][i][2])*((res\_coeff\_q[yIdx][uIdx][vIdx][i][2]<<7)+res\_coeff\_r[yIdx][uIdx][vIdx][i][2]) \quad (13)$$

A number of LSBs may be fixed to be 7. Alternatively, a different number of LSBs may be used. For example, a different number of LSBs may be used where a fixed value of 7 to divide the magnitude (e.g., absolute) value of a prediction residual resCoeff into two parts is not desired. A magnitude of resCoeff may have two parts, an integer part and a decimal part, but the point at which these two parts are divided may not be fixed and may depend on one or both of two factors in a CGS system, a value of cm_res_quant_bits for a current 3D LUT and a value of nMappingShift that may depend on a delta between an input bit depth and an output bit depth. In an embodiment, nMappingShift may be equal to 10 minus the difference between outputDepth and inputDepth.

In an embodiment, a total number of bits used to represent a magnitude of resCoeff may be denoted as N. A decimal part of resCoeff magnitude may be represented in (nMappingShift-cm_res_quant_bits) number of bits and an integer part of resCoeff magnitude may be represented by a remaining (N-nMappingShift+cm_res_quant_bits) number of bits.

In an embodiment, a length of LSBs that may be fixed-length coded may be adaptively chosen. A value of (nMappingShift-cm_res_quant_bits-cm_delta_flc_bits) may be used to determine a number of LSBs that may be fixed-length coded, where cm_delta_flc_bits may be a relatively small integer value such as 0, 1, 2, or 3. A value of cm_delta_flc_bits may be preselected by an encoder/decoder and may be fixed. A value of cm_delta_flc_bits may be adaptively selected by an encoder and signaled as part of a 3D LUT table using the following syntax table Table 3 and semantics. In order to determine cm_delta_flc_bits, an encoder may count a number of bits needed to code some or all resCoeff values for some or all color components, some or all model parameters, and some or all octants, for an allowed value of cm_delta_flc_bits (e.g., 0 to 3). The encoder may select a cm_delta_flc_bits value that minimizes an overall cost of coding all resCoeff values. The complexity of such an exhaustive search may be very small when only numbers of bits are counted, and actual coding may not be performed.

TABLE 3

Syntax Table

| | Descriptor |
|---|---|
| color_mapping_table( ) { | |
|    cm_octant_depth | u(2) |
|    cm_y_part_num_log2 | u(2) |
|    cm_input_luma_bit_depth_minus8 | u(3) |
|    cm_input_chroma_bit_depth_delta | se(v) |
|    cm_output_luma_bit_depth_minus8 | u(3) |
|    cm_output_chroma_bit_depth_delta | se(v) |
|    cm_res_quant_bits | u(2) |
|    cm_delta_flc_bits | u(2) |
|    if( cm_octant_depth = = 1 ) { | |
|       cm_adapt_threshold_u_delta | se(v) |
|       cm_adapt_threshold_v_delta | se(v) |
|    } | |
|    color_mapping_octants( 0, 0, 0, 0, 1 << | |
|    cm_octant_depth ) | |
| } | |

In an embodiment, cm_res_quant_bits may specify a number of least significant bits to be added to a vertex residual values res_y, res_u and res_v. A reconstruction of a prediction residual for each color component, each parameter, and each octant may be revised as described herein. The variables CMResY[yIdx][uIdx][vIdx][i], CMResU[yIdx][uIdx][vIdx][i], and CMResV[yIdx][uIdx][vIdx][i] may be derived as shown below in equations 14, 15, 16, and 17:

$$nFLCBits = nMappingShift - res\_quant\_bits - cm\_delta\_flc\_bits \quad (14)$$

$$CMResY[yIdx][uIdx][vIdx][i] = (1-2*res\_coeff\_s[yIdx][uIdx][vIdx][i][0])*((res\_coeff\_q[yIdx][uIdx][vIdx][i][0] << nFLCBits) + res\_coeff\_r[yIdx][uIdx][vIdx][i][0]) \quad (15)$$

$$CMResU[yIdx][uIdx][vIdx][i] = (1-2*res\_coeff\_s[yIdx][uIdx][vIdx][i][1])*((res\_coeff\_q[yIdx][uIdx][vIdx][i][1] << nFLCBits) + res\_coeff\_r[yIdx][uIdx][vIdx][i][1]) \quad (16)$$

$$CMResV[yIdx][uIdx][vIdx][i] = (1-2*res\_coeff\_s[yIdx][uIdx][vIdx][i][2])*((res\_coeff\_q[yIdx][uIdx][vIdx][i][2] << nFLCBits) + res\_coeff\_r[yIdx][uIdx][vIdx][i][2]) \quad (17)$$

Figure 11A:
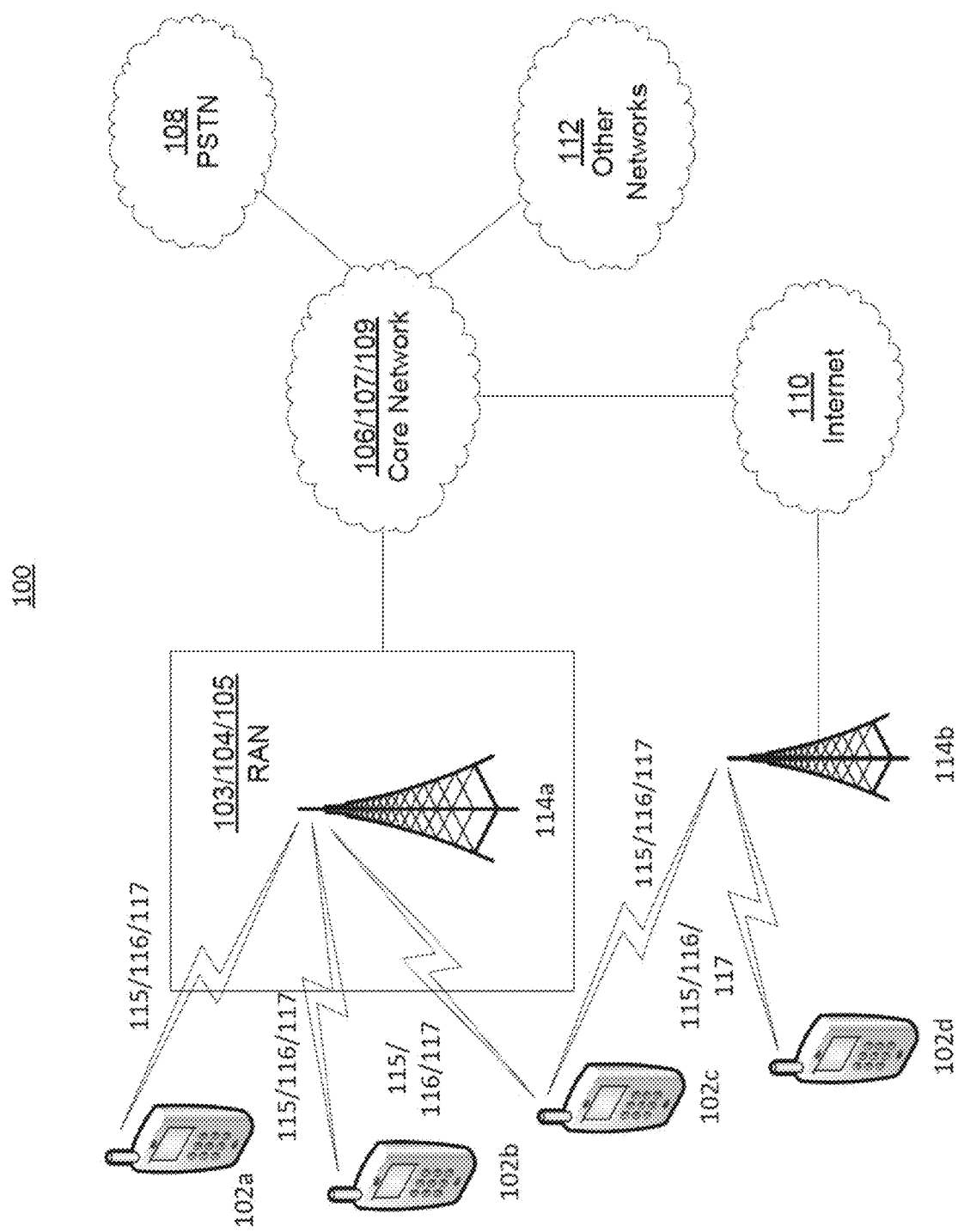
FIG. 11A is a system diagram of an example communications system in which the disclosed subject matter may be implemented.

FIG. 11A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single carrier FDMA (SC-FDMA), and the like.

FIG. 11A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 11A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, e.g., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 11A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 11A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, 102d may include multiple transceivers for communicating with different wireless networks over different wireless links. For example, the WTRU 102c shown in FIG. 11A may be configured to communicate with the base station 114a, which may employ a cellular-based radio technology, and with the base station 114b, which may employ an IEEE 802 radio technology.

Figure 11B:
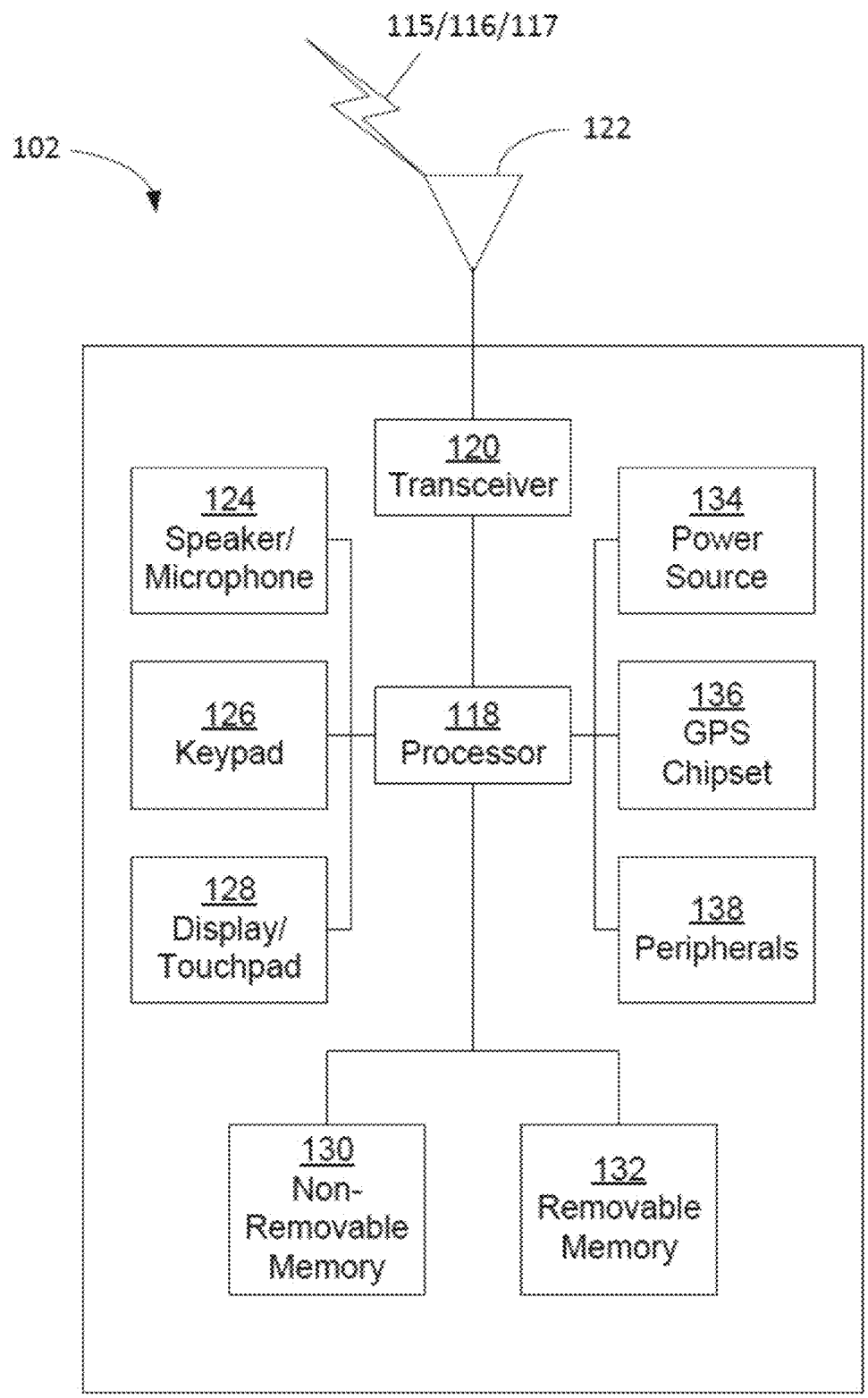
FIG. 11B is a system diagram of an example wireless transmit/receive unit (WTRU) that may be used within the communications system illustrated in FIG. 11A.

FIG. 11B is a system diagram of an example WTRU 102. As shown in FIG. 11B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 11B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 11B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 11B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality, and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 11C:
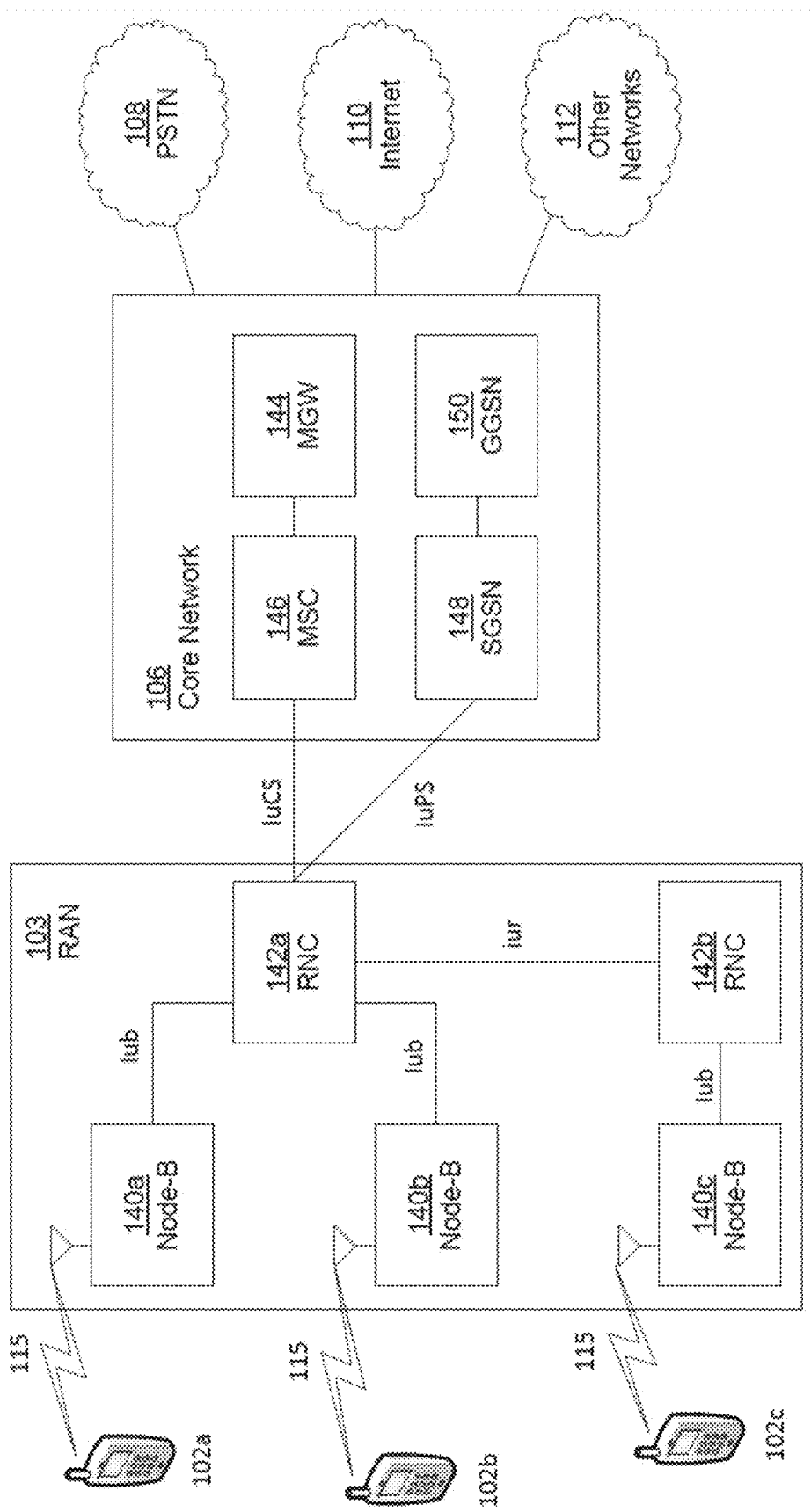
FIG. 11C is a system diagram of an example radio access network and an example core network that may be used within the communications system illustrated in FIG. 11A.

FIG. 11C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 11C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 11C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 11C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 11D:
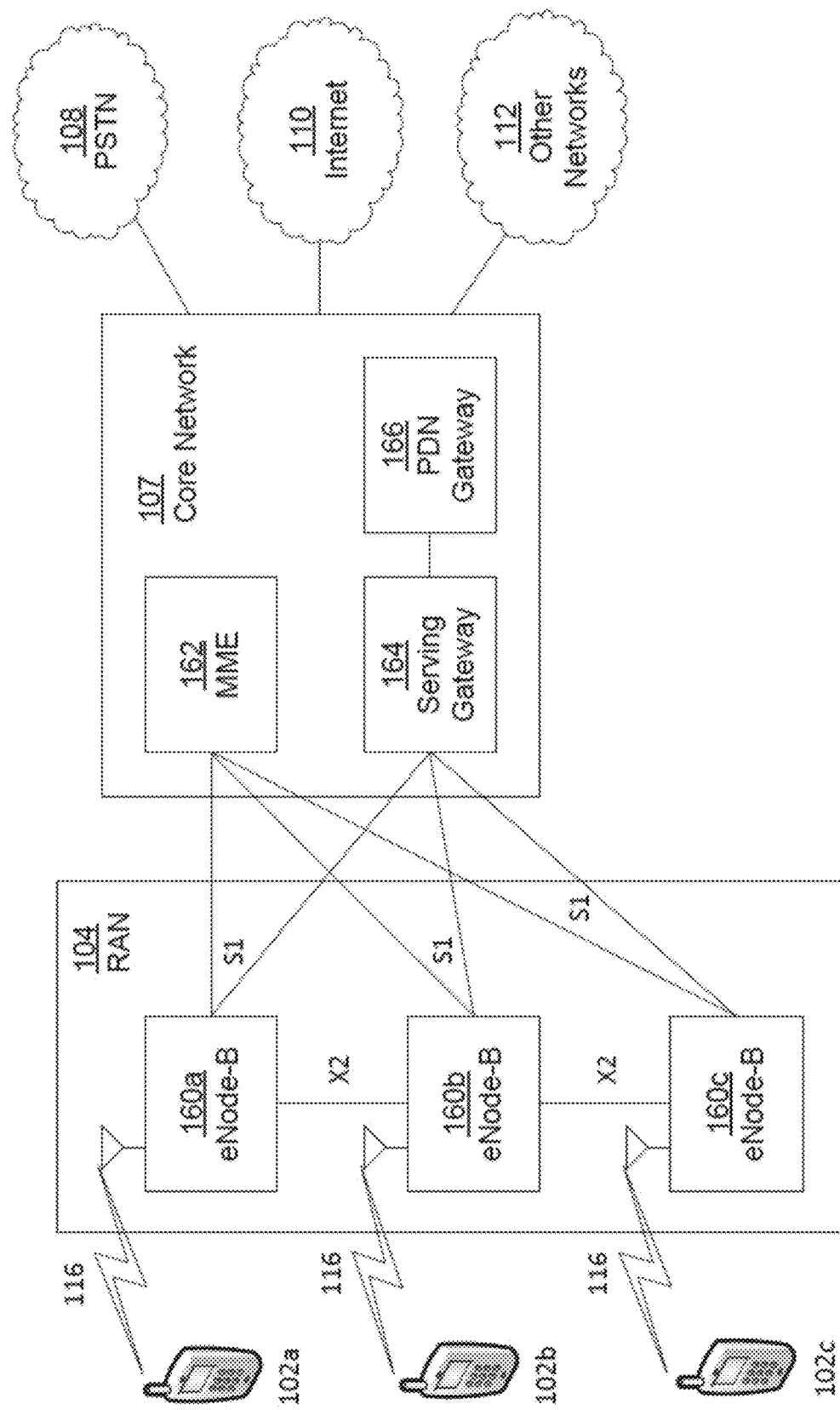
FIG. 11D is a system diagram of another example radio access network and an example core network that may be used within the communications system illustrated in FIG. 11A.

FIG. 11D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 11D, the eNode-Bs 160a, 160b, 160c may communicate with one another over an X2 interface.

The core network 107 shown in FIG. 11D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 11E:
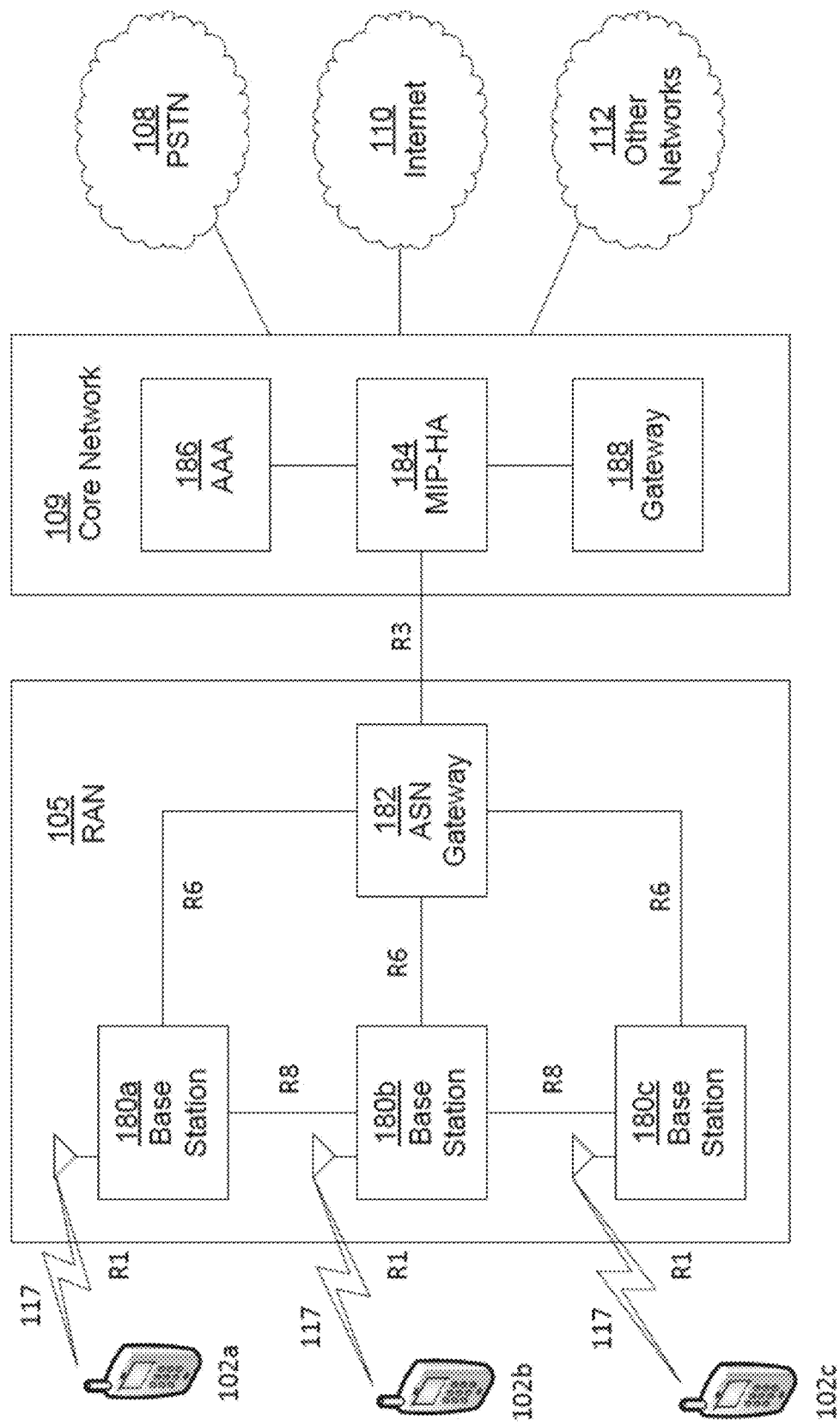
FIG. 11E is a system diagram of another example radio access network and an example core network that may be used within the communications system illustrated in FIG. 11A.

FIG. 11E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 11E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 11E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 11E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for encoding video content, the method comprising:
   obtaining a current picture of a video;
   identifying a temporal level of the current picture;
   calculating a potential rate-distortion cost based on the identified temporal level of the current picture, wherein distortion is weighted more heavily for a lower temporal level than a higher temporal level;
   determining a look-up table (LUT) size of a color mapping LUT for the current picture based on the potential rate-distortion cost;
   generating the color mapping LUT of the determined LUT size for the current picture;
   deriving, using the color mapping LUT of the LUT size, an inter-layer reference (ILR) picture based on the current picture; and
   including an indication of the determined LUT size for the color mapping LUT associated with the current picture in a bitstream.

2. The method of claim 1, wherein the LUT size for the color mapping LUT associated with the current picture is selected from a plurality of potential LUT sizes, and the method further comprises:

calculating a plurality of potential rate-distortion costs that correspond to coding the current picture with the plurality of potential LUT sizes; and
   selecting an optimal LUT size that corresponds to the smallest rate-distortion cost as the LUT size for the color mapping LUT associated with the current picture.

3. The method of claim 2, wherein the plurality of potential LUT sizes are limited by a maximum LUT size, and the method further comprises:
   estimating a number of bits for coding the current picture; and
   determining the maximum LUT size based on the estimated number of bits for coding the current picture.

4. The method of claim 1, further comprising:
   determining a distortion weighting factor based on the temporal level of the current picture, wherein the potential rate-distortion cost is calculated using the distortion weighting factor such that distortion is weighted more heavily when the temporal level of the current picture is a low temporal level than when the temporal level of the current picture is a high temporal level.

5. The method of claim 1, further comprising:
   generating an enhancement layer picture based on the current picture;
   determining a usage of the ILR picture in predicting the enhancement layer picture; and
   determining, based on the determined usage of the ILR picture, a distortion weighting factor for calculating the potential rate-distortion cost such that distortion is weighted more heavily when the ILR picture is used in predicting the enhancement layer picture.

6. The method of claim 1, further comprising:
   calculating a first rate-distortion cost associated of coding the current picture using a color mapping LUT of a first LUT size; and
   calculating a second rate-distortion cost associated of coding the current picture using a color mapping LUT of a second LUT size, wherein the LUT size for the color mapping LUT associated with the current picture is determined based on comparing the first and second rate-distortion costs.

7. The method of claim 1, further comprising:
   determining whether to disable picture-level color mapping LUT update based on the temporal level of the current picture, wherein the picture-level color mapping LUT update is disabled when the temporal level of the current picture is high.

8. A video encoding device comprising:
   a processor configured to:
   obtain a current picture in a video;
   identify a temporal level of the current picture;
   calculate a potential rate-distortion cost based on the identified temporal level of the current picture, wherein distortion is weighted more heavily for a lower temporal level than a higher temporal level;
   determine a look-up table (LUT) size of a color mapping LUT for the current picture based on a potential rate-distortion cost;
   generate the color mapping LUT of the determined LUT size for the current picture;
   derive, using the color mapping LUT of the LUT size, an inter-layer reference (ILR) picture based on the current picture; and
   include an indication of the determined LUT size for the color mapping LUT associated with the current picture in a bitstream.

9. The video encoding device of claim 8, wherein the LUT size for the color mapping LUT associated with the current picture is selected from a plurality of potential LUT sizes, the processor is further configured to:
  calculate a plurality of potential rate-distortion costs that correspond to coding the current picture with the plurality of potential LUT sizes; and
  select an optimal LUT size having the smallest rate-distortion cost as the LUT size for the color mapping LUT associated with the current picture.

10. The video encoding device of claim 9, wherein the plurality of potential LUT sizes are limited by a maximum LUT size, the processor is further configured to:
  estimate a number of bits for coding the current picture; and
  determine the maximum LUT size based on the estimated number of bits for coding the current picture.

11. The video encoding device of claim 8, wherein the processor is further configured to:
  determine a distortion weighting factor based on the temporal level of the current picture, wherein the potential rate-distortion cost is calculated using the distortion weighting factor such that distortion is weighted more heavily when the temporal level of the current picture is a low temporal level than when the temporal level of the current picture is a high temporal level.

12. The video encoding device of claim 8, wherein the processor is further configured to:
  generate an enhancement layer picture based on the current picture;
  determine a usage of the ILR picture in predicting the enhancement layer picture; and
  determine, based on the determined usage of the ILR picture, a distortion weighting factor for calculating the potential rate-distortion cost such that distortion is weighted more heavily when the ILR picture is used in predicting the enhancement layer picture.

13. The video encoding device of claim 8, wherein the processor is further configured to:
  calculate a first rate-distortion cost associated of coding the current picture using a color mapping LUT of a first LUT size; and
  calculate a second rate-distortion cost associated of coding the current picture using a color mapping LUT of a second LUT size, wherein the LUT size for the color mapping LUT associated with the current picture is determined based on comparing the first and second rate-distortion costs.

14. The video encoding device of claim 8, wherein the processor is further configured to:
  determine whether to disable picture-level color mapping LUT update based on the temporal level of the current picture, wherein the picture-level color mapping LUT update is disabled when the temporal level of the current picture is high.

* * * * *